US008893168B2

(12) United States Patent
Sinha et al.

(10) Patent No.: US 8,893,168 B2
(45) Date of Patent: Nov. 18, 2014

(54) METHOD AND SYSTEM FOR SYNCHRONIZATION OF DIAL TESTING AND AUDIENCE RESPONSE UTILIZING AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US); Karl-Christian Sebastian Wolff-Ingham, Decatur, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 13/730,718

(22) Filed: Dec. 28, 2012

(65) Prior Publication Data

US 2013/0205322 A1 Aug. 8, 2013

Related U.S. Application Data

(60) Provisional application No. 61/596,012, filed on Feb. 7, 2012.

(51) Int. Cl.
*H04H 60/32* (2008.01)
*H04N 21/44* (2011.01)
(Continued)

(52) U.S. Cl.
CPC ....... *H04N 21/44008* (2013.01); *H04N 21/435* (2013.01); *H04N 21/478* (2013.01);
(Continued)

(58) Field of Classification Search
None
See application file for complete search history.

(56) References Cited

U.S. PATENT DOCUMENTS

| | | | |
|---|---|---|---|
| 5,410,326 A | 4/1995 | Goldstein | |
| 5,437,050 A | 7/1995 | Lamb et al. | |

(Continued)

FOREIGN PATENT DOCUMENTS

| | | |
|---|---|---|
| EP | 1485815 | 10/2007 |
| EP | 1354276 | 12/2007 |

(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Brian T Pendleton
*Assistant Examiner* — Jean D Saint Cyr
(74) *Attorney, Agent, or Firm* — Arent Fox LLP

(57) ABSTRACT

Systems, methods and/or techniques for synchronization of dial testing and audience response utilizing automatic content recognition (ACR) are described. Synchronized dial testing and audience response techniques may utilize a system that is operable to perform ACR and that may implement an abstraction layer. An ACR system may be operable to detect a desired portion (e.g., a frame or scene) of a program that is streaming or communicated over a live network or broadcast feed, to a smart TV for example. Synchronized dial testing and audience response techniques may be employed to initiate an interactive event or application that appears on a smart TV in response to a detected point or portion of a program, such that the content presented by the application is synchronized to the content of the live network or broadcast feed.

20 Claims, 12 Drawing Sheets

(51) Int. Cl.
*H04N 21/435* (2011.01)
*H04N 21/478* (2011.01)
*H04N 21/4722* (2011.01)
*G06F 17/30* (2006.01)
*H04N 21/442* (2011.01)
*H04N 21/81* (2011.01)
*G06F 3/0484* (2013.01)
*H04N 21/4784* (2011.01)
*H04N 21/441* (2011.01)
*G06T 1/00* (2006.01)

(52) U.S. Cl.
CPC ...... *H04N 21/4722* (2013.01); *G06F 17/30495* (2013.01); *H04N 21/442* (2013.01); *H04N 21/812* (2013.01); *G06F 3/0484* (2013.01); *H04N 21/4784* (2013.01); *H04N 21/441* (2013.01); *G06T 1/0021* (2013.01)
USPC .................................. 725/19; 725/17; 725/20

(56) References Cited

U.S. PATENT DOCUMENTS

| | | | |
|---|---|---|---|
| 5,874,686 | A | 2/1999 | Ghias et al. |
| 5,918,223 | A | 6/1999 | Blum et al. |
| 5,956,683 | A | 9/1999 | Jacobs et al. |
| 5,991,737 | A | 11/1999 | Chen |
| 6,121,530 | A | 9/2000 | Sonoda |
| 6,184,877 | B1 | 2/2001 | Dodson et al. |
| 6,201,176 | B1 | 3/2001 | Yourlo |
| 6,314,577 | B1 | 11/2001 | Pocock |
| 6,408,272 | B1 | 6/2002 | White et al. |
| 6,504,089 | B1 | 1/2003 | Negishi et al. |
| 6,556,218 | B1 | 4/2003 | Alcorn |
| 6,760,720 | B1 | 7/2004 | De Bellis |
| 6,765,595 | B2 | 7/2004 | Lee et al. |
| 6,834,308 | B1 | 12/2004 | Ikezoye et al. |
| 6,968,337 | B2 | 11/2005 | Wold |
| 6,990,453 | B2 | 1/2006 | Wang et al. |
| 7,080,325 | B2 | 7/2006 | Treibach-Heck et al. |
| 7,134,132 | B1 | 11/2006 | Ngo et al. |
| 7,174,293 | B2 | 2/2007 | Kenyon et al. |
| 7,190,971 | B1 | 3/2007 | Kawamoto |
| 7,194,752 | B1 | 3/2007 | Kenyon et al. |
| 7,266,343 | B1 | 9/2007 | Yli-juuti et al. |
| 7,363,278 | B2 | 4/2008 | Schmelzer et al. |
| 7,444,353 | B1 | 10/2008 | Chen et al. |
| 7,500,007 | B2 | 3/2009 | Ikezoye et al. |
| 7,529,659 | B2 | 5/2009 | Wold |
| 7,562,012 | B1 | 7/2009 | Wold et al. |
| 7,562,392 | B1 | 7/2009 | Rhoads et al. |
| 7,565,327 | B2 | 7/2009 | Schmelzer |
| 7,707,088 | B2 | 4/2010 | Schmelzer |
| 7,711,652 | B2 | 5/2010 | Schmelzer |
| 7,730,509 | B2 | 6/2010 | Boulet et al. |
| 7,783,489 | B2 | 8/2010 | Kenyon et al. |
| 7,797,249 | B2 | 9/2010 | Schmelzer et al. |
| 7,870,574 | B2 | 1/2011 | Kenyon et al. |
| 7,877,438 | B2 | 1/2011 | Schrempp et al. |
| 7,917,645 | B2 | 3/2011 | Ikezoye et al. |
| 8,006,274 | B2 | 8/2011 | Scott, III |
| 8,249,422 | B2 | 8/2012 | Narahara et al. |
| 8,418,206 | B2 | 4/2013 | Bryant et al. |
| 8,553,148 | B2 | 10/2013 | Ramaswamy et al. |
| 2002/0083060 | A1 | 6/2002 | Wang et al. |
| 2003/0035075 | A1 | 2/2003 | Butler et al. |
| 2003/0055699 | A1 | 3/2003 | O'Connor |
| 2003/0172381 | A1 | 9/2003 | Janevski |
| 2004/0003397 | A1 | 1/2004 | Boston et al. |
| 2004/0034874 | A1 | 2/2004 | Hord et al. |
| 2004/0068737 | A1 | 4/2004 | Itoh et al. | |
| 2005/0022211 | A1* | 1/2005 | Veselov et al. ............... 719/318 |
| 2005/0097599 | A1 | 5/2005 | Plotnick et al. |
| 2006/0026636 | A1 | 2/2006 | Stark et al. |
| 2006/0031684 | A1 | 2/2006 | Sharma et al. |
| 2007/0192784 | A1 | 8/2007 | Postrel |
| 2008/0104634 | A1 | 5/2008 | Gajdos et al. |
| 2008/0305815 | A1 | 12/2008 | McDonough |
| 2008/0310731 | A1 | 12/2008 | Stojancic et al. |
| 2008/0313140 | A1 | 12/2008 | Pereira et al. |
| 2009/0064261 | A1 | 3/2009 | Jung |
| 2009/0106104 | A1 | 4/2009 | Upendran et al. |
| 2009/0133049 | A1 | 5/2009 | Bradley |
| 2009/0150930 | A1 | 6/2009 | Sherwin et al. |
| 2009/0235317 | A1 | 9/2009 | Igarashi |
| 2009/0317053 | A1 | 12/2009 | Morley et al. |
| 2009/0318114 | A1 | 12/2009 | Bertoni |
| 2010/0007797 | A1 | 1/2010 | Stojancic |
| 2010/0095337 | A1 | 4/2010 | Dua |
| 2010/0121691 | A1 | 5/2010 | Shifflett et al. |
| 2010/0162344 | A1 | 6/2010 | Casagrande et al. |
| 2010/0205628 | A1 | 8/2010 | Davis et al. |
| 2010/0242065 | A1* | 9/2010 | Murakami ...................... 725/34 |
| 2010/0269128 | A1* | 10/2010 | Gordon ......................... 725/25 |
| 2010/0303338 | A1 | 12/2010 | Stojancic et al. |
| 2010/0306193 | A1 | 12/2010 | Pereira et al. |
| 2010/0318515 | A1 | 12/2010 | Ramanathan et al. |
| 2011/0067046 | A1 | 3/2011 | Cox et al. |
| 2011/0078729 | A1 | 3/2011 | LaJoie et al. |
| 2011/0088063 | A1 | 4/2011 | Ben-Romdhane et al. |
| 2011/0177775 | A1 | 7/2011 | Gupta et al. |
| 2011/0191806 | A1 | 8/2011 | Knudson et al. |
| 2011/0280434 | A1* | 11/2011 | Mamidwar et al. ........... 382/100 |
| 2011/0283327 | A1 | 11/2011 | Zhu |
| 2011/0311095 | A1 | 12/2011 | Archer |
| 2011/0313856 | A1 | 12/2011 | Cohen et al. |
| 2012/0017236 | A1 | 1/2012 | Stafford et al. |
| 2012/0096491 | A1 | 4/2012 | Shkedi |
| 2012/0117584 | A1 | 5/2012 | Gordon |
| 2012/0185895 | A1 | 7/2012 | Wong et al. |
| 2012/0246693 | A1 | 9/2012 | Iqbal |
| 2013/0019262 | A1 | 1/2013 | Bhatia et al. |
| 2013/0125163 | A1 | 5/2013 | Chen et al. |
| 2013/0132999 | A1 | 5/2013 | Pandey |
| 2013/0305335 | A1 | 11/2013 | Syed et al. |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al, "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

News Co. Results

Do you believe the national media has covered the presidential race fairly?

Yes 88%
No 12%

Total Votes: 20,736
*Not a scientific pole*

Sponsored by [ advertisement ]

News Co. Vote

Thanks for participating in our poll. Stay tuned for results.

Sponsored by [ advertisement ]

News Co. Results

Do you believe the national media has covered the presidential race fairly?

Yes ○
No ○

Total Votes: 20,736

*Not a scientific pole*

Sponsored by [ advertisement ]

Signed in as Member1
(go to Account)

Click ( OK ) to interact

Brought to you by [ advertisement ]

Login:

Username:
Password:

Not a member? Register

METHOD AND SYSTEM FOR SYNCHRONIZATION OF DIAL TESTING AND AUDIENCE RESPONSE UTILIZING AUTOMATIC CONTENT RECOGNITION

CROSS-REFERENCE TO RELATED APPLICATIONS

This application makes reference to, claims priority to, and claims the benefit of U.S. provisional application 61/596,012, filed on Feb. 7, 2012.

This application makes reference to:
U.S. patent application Ser. No. 13/730,359 filed on Dec. 28, 2012;
U.S. patent application Ser. No. 13/730,422 filed on Dec. 28, 2012;
U.S. patent application Ser. No. 13/730,459 filed on Dec. 28, 2012;
U.S. patent application Ser. No. 13/730,495 filed on Dec. 28, 2012;
U.S. patent application Ser. No. 13/730,530 filed on Dec. 28, 2012;
U.S. patent application Ser. No. 13/730,754 filed on Dec. 28, 2012;
U.S. patent application Ser. No. 13/730,559 filed on Dec. 28, 2012; and
U.S. patent application Ser. No. 13/730,579 filed on Dec. 28, 2012;
U.S. patent application Ser. No. 13/730,593 filed on Dec. 28, 2012;
U.S. patent application Ser. No. 13/730,759 filed on Dec. 28, 2012;
U.S. patent application Ser. No. 13/730,627 filed on Dec. 28, 2012;
U.S. patent application Ser. No. 13/730,644 filed on Dec. 28, 2012;
U.S. patent application Ser. No. 13/730,656 filed on Dec. 28, 2012;
U.S. patent application Ser. No. 13/730,670 filed on Dec. 28, 2012;
U.S. patent application Ser. No. 13/730,691 filed on Dec. 28, 2012;
U.S. patent application Ser. No. 13/730,702 filed on Dec. 28, 2012; and
U.S. patent application Ser. No. 13/730,734 filed on Dec. 28, 2012.

Each of the above referenced applications is hereby incorporated herein by reference in its entirety.

FIELD OF THE INVENTION

Certain embodiments of the invention relate to digital audio/video content recognition. More specifically, certain embodiments of the invention relate to a method and system for synchronization of dial testing and audience response utilizing automatic content recognition.

BACKGROUND OF THE INVENTION

Smart or connected televisions (TVs) may receive data from data networks that allow a viewer to access broadcast digital content and also receive multimedia content. Smart TVs may also be capable of receiving and communicating information over the internet.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for synchronization of dial testing and audience response utilizing automatic content recognition, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 6A-6E are each diagrams that show exemplary window overlays that a viewer of an End-user device may see, in accordance with an embodiment of the present invention.

DETAILED DESCRIPTION OF THE INVENTION

Figure 1:
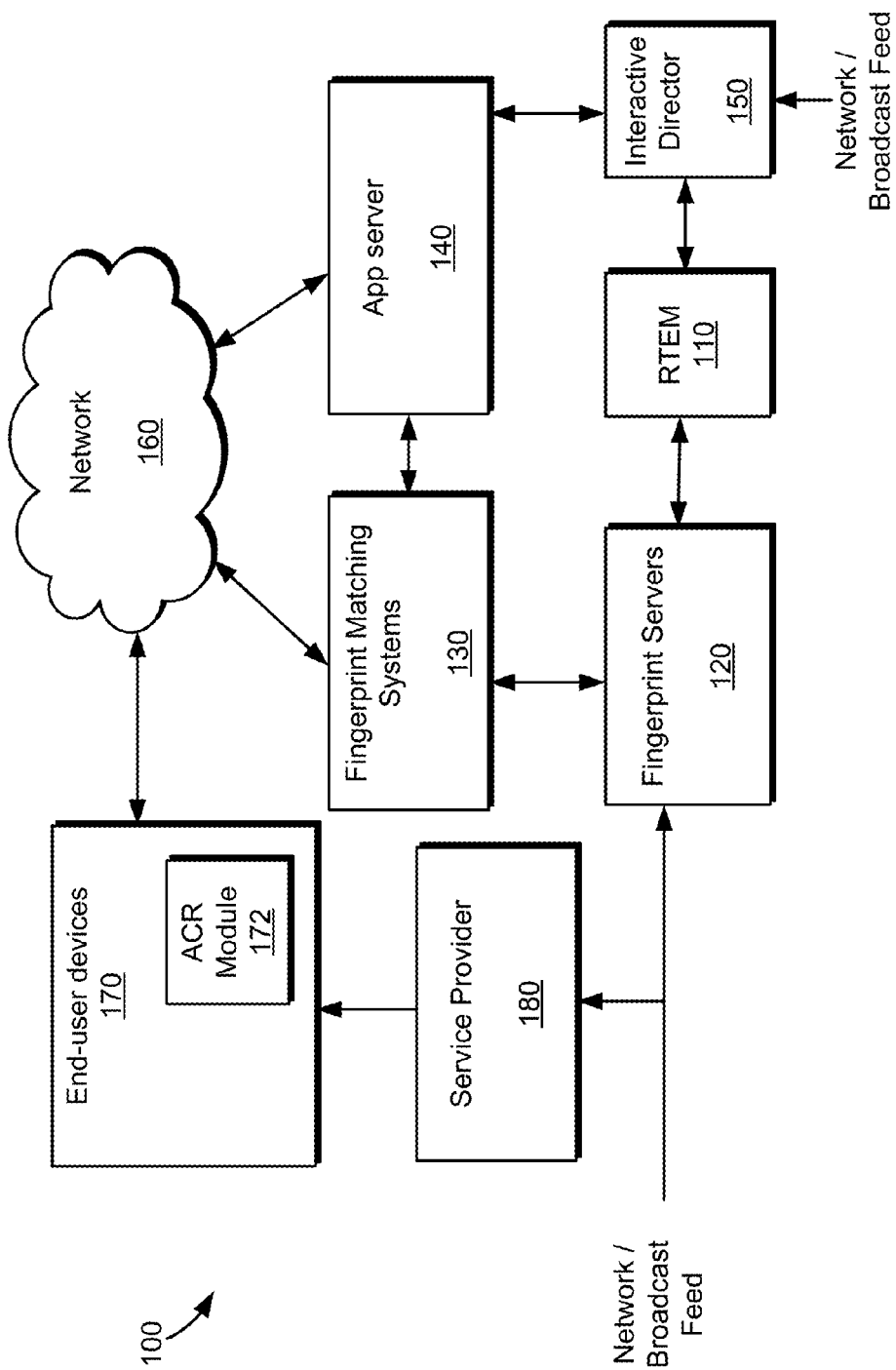
FIG. 1 is a high-level block diagram that shows an exemplary synchronized dial testing and audience response system, in accordance with one or more embodiments of the present invention.

Certain embodiments of the present disclosure may be found in a method and system for synchronization of dial testing and audience response utilizing automatic content recognition (ACR). Various embodiments of the present invention may implement synchronized dial testing and audience response techniques utilizing a system that is operable to perform ACR and that may implement an abstraction layer. An ACR system may be operable to detect a desired portion (e.g., a frame or scene) of a program that may be streaming over a live network or broadcast feed, to a smart TV for example. Synchronized dial testing and audience response techniques may be employed to initiate an interactive event or application that appears on a smart TV (or other media device or end-user device) in response to a detected point or portion of a program, such that the content presented by the application may be synchronized to the content of the live network or broadcast feed. A viewer may interact with the application and a smart TV may cause viewer/user responses to be transmitted to one or more locations.

The ACR system may utilize a real-time event manager (RTEM) to implement the abstraction layer to enable communication and/or interaction with a plurality of fingerprint servers. A network time server, which may also be referred to as a network protocol time (NTP) server or a network/broadcast time server, may be utilized to provide timing synchronization in the ACR system. The RTEM may operate as a triggering mechanism that provides events (i.e., event identifier and corresponding data) to the multiple fingerprint servers (RTFS's), each of which associates the event(s) to the corresponding fingerprints of the broadcast network. That is, the RTEM and the fingerprinting servers can operate based on a common reference clock provided by the NTP server. Each of the fingerprint servers may generate a set of video fingerprints in real time from a network or broadcast feed by utilizing a video fingerprint technology. Different fingerprint servers within an ACR system may utilize different fingerprinting technologies, which may be associated with different fingerprinting vendors, for example. The fingerprint servers may also be referred to as real-time fingerprint servers (RTFSs). A monitor application in the ACR system may be operable to assign one or more interactive event identifiers to the RTEM by associating an NTP broadcast time to a fingerprint that is then propagated to other fingerprint systems (e.g., fingerprint servers) via an application programming interface (API). The fingerprint servers may communicate the sets of video fingerprints and interactive event identifiers to corresponding fingerprint matching systems, which in turn may communicate with End-user devices that utilize the same video fingerprint technology as the corresponding fingerprint server.

Additionally, various embodiments of the present invention may implement synchronized dial testing and audience response techniques by utilizing an application server (also referred to as an app server for short) that may provide application data to end-user devices (media devices) in response to a match between a fingerprint taken by the end-user device and a fingerprint taken by a corresponding fingerprint server. An interactive director may communicate with the RTEM to assign one or more interactive event identifiers to video fingerprints associated with live content from a network/broadcast feed. The network television feed may comprise network time reference information (e.g., a network timestamp) utilized to synchronize interactive event identifiers to the different video fingerprints, and interactive event identifiers may be assigned to video fingerprints based on this network time reference information. The interactive director may also communicate with the application server to prepare, select or activate interactive events, applications, application data or other content that may be provided to end-user devices (media devices).

Event identifiers may provide information about different interactive events that may take place in an end-user device, for example connected or smart TVs, PDAs, tablets, smart phones or other media devices. A connected TV may refer to, for example, a television that has Internet access and/or is capable of running applications. The event identifiers may also be referred to as interactive event identifiers (IDs), for example. The event identifiers may be determined from an interactive director's input for live programming, as explained above. Alternatively, event identifiers may be determined from a predetermined network schedule, or from offline video and/or audio content, which has been pre-processed and stored.

The abstraction layer, as utilized in some embodiments of an ACR system, may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors.

Fingerprinting, and more particularly ACR fingerprinting, may refer to a process by which features of a video frame and/or of an audio frame may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in the ACR system such that unidentified content (e.g., content from a network television feed) may be identified by comparing fingerprints taken of the unidentified content with the stored fingerprints.

Once the event identifiers have been assigned by the RTEM, the fingerprint servers may communicate the video fingerprints and the assigned event identifiers to corresponding fingerprint matching systems. In some instances, the fingerprint matching systems may be operated by a third party (e.g., television manufacturers, vendors etc.) as hosted services over the Internet (e.g., cloud computing, etc.). Each of the fingerprint matching systems may communicate with devices (e.g., connected TVs, tablets, smartphones, etc.) that utilize the same video fingerprint technology utilized by the fingerprint server that corresponds to that fingerprint matching system. These devices may be referred to as viewer or end user devices, for example.

The fingerprint matching systems may receive video fingerprints from end-user devices and compare them to fingerprints received from fingerprint servers. When a match occurs, the fingerprint matching systems may notify the end-user devices (media devices) that an interactive event is to take place if there is an event identifier that corresponds to the matched video fingerprints. Interactive events may then be pushed by an app server to an end-user device. Interactive events may include, but are not limited to, invitations for a viewer of an end-user device to interact with a question, poll or other interactive application. The viewer or user may interact with the application via a remote associated with the viewer's end-user device, or the user may interact via a second-screen device which is a device that interacts (wirelessly, for example) with the main end-user device, allowing the user to respond to prompts that appear on the main end-user device. In multi-screen viewing experiences, for example, companion applications on second-screen devices may also be utilized to interact with the same interactive event as appears on the main end-user device. The viewer or user's response (also referred to as user response data) may then be communicated by the end-user device, over a network to a server, such as, for example, the same app server that initiated the interactive event.

Having the ability to identify context and program timing and then prompt a viewer for interaction may enable a network to increase audience engagement, extend viewing times, and provide program sponsors additional ways to engage with the audience, such as offering viewers relevant polling or other questions.

Below are described various exemplary aspects of the invention related to synchronized dial testing and audience response that may be implemented at least in part in an ACR system, which utilizes an architecture based on the abstraction layer. These exemplary aspects may comprise the system architecture, processes, application programming interfaces (APIs), and/or web-based services.

FIG. 1 is a high-level block diagram that shows an exemplary synchronized dial testing and audience response system, in accordance with one or more embodiments of the present invention. Referring to FIG. 1, there is shown a synchronized dial testing and audience response system 100. The system 100 may comprise an real-time event manager (RTEM) 110, one or more fingerprint servers 120, one or more fingerprint matching systems 130, an app server 140, an interactive director 150, a network 160, one or more end-user devices 170, and service provider 180. A live network/broadcast feed (shown in FIG. 1) may be provided to the system 100, and the same broadcast feed may be read/analyzed by end-user devices 170 connected to system 100 and by fingerprint servers 120 (and for example other modules) included in system 100. Each of the end user devices 170 may comprise an ACR module 172.

The real-time event manager 110 may comprise suitable logic, circuitry, code, and/or interfaces that may be operable to manage real-time events based on inputs provided by one or more sources. For example, the real-time event manager 110 may be operable to manage real-time events provided by an interactive director that may assign interactive event IDs to live programming as the network/broadcast feed is being fingerprinted in real time. Although FIG. 1 focuses on the interaction between an interactive director for live events, the real-time event manager 110 may also manage interactive events provided by a network schedule or an interactive timeline archive, which may be prepared by a component that analyzes and archives video segments. The real-time event manager 110 may be operable to provide synchronization of multiple fingerprint servers utilizing multiple fingerprint technologies. Moreover, the real-time event manager 110 may be operable to trigger interactive events in legacy systems and/or in web-based systems.

The real-time event manager 110 may be operable to receive one or more inputs from an interactive director 150 and generate, based on those inputs, interactive event identifiers (IDs) that can be communicated to the fingerprint servers where they can be associated with or assigned to the video fingerprints generated by the fingerprint servers 120. The real-time event manager 110 may be operable to communicate the interactive event IDs to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the real-time event manager 110 may be operable to generate one or more signals that provide instructions to the fingerprint servers 120 to enable the identification of a network television station based on the logo, symbol, sign, watermark, and/or text that are typically utilized to represent the network television station. The instructions may be related to information that is to be generated and/or provided to the end-user devices 170 for network television station identification. The instructions may indicate the type of information that is to be provided to the end-user devices 170 and/or when such information is to be provided. In some instances, a portion of the ACR system 100 other than the real-time event manager 110, or in conjunction with the real-time event manager 110, may generate the signals for providing instructions to the fingerprint servers 120.

The fingerprint servers 120 may comprise suitable logic, circuitry, code, and/or interfaces that may be operable to handle fingerprinting and fingerprint communications to the fingerprint matching systems 130. Since each vendor or television manufacturer is likely to utilize its own fingerprint technology, each of the fingerprint servers 120 may be a dedicated server for each of the fingerprint technologies supported by the system 100. In some embodiments of the invention, a portion of one or more fingerprint servers 120 may be operable to perform video fingerprinting while a portion may be operable to perform audio fingerprinting, or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the fingerprint servers 120 may be operable to receive one or more signals from the real-time event manager 110 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 170 to take fingerprints of the video content being displayed on a viewing screen. In some instances, at least a portion of the fingerprinting locations may be provided by the real-time event manager 110 and/or by another portion of the ACR system 100 through the instructions received by the fingerprint servers 120. In other instances, the fingerprinting locations may be determined by the fingerprint servers 120 based on locally and/or remotely stored information. Each fingerprinting location may comprise coordinates in a video frame (e.g., x coordinates, y coordinates) that indicate a particular region in the video frame to fingerprint.

The fingerprint servers 120 may provide the fingerprinting locations for communication to the end-user devices 170, for example, in the form of fingerprint profiles. The fingerprint profiles may comprise fingerprinting locations and/or other information to be utilized by an end-user device for ACR fingerprinting. In some instances, the fingerprint profiles may be generated by the fingerprint servers 120 in response to the instructions received. In other instances, the fingerprint profiles comprising the fingerprinting locations may be received by the fingerprint servers from the real-time event manager 110 and/or from another portion of the ACR system 100. The fingerprint profile of a particular end-user device 170 may be updated based on an indication that additional and/or different locations may be needed during fingerprinting to identify the network television station logo or symbol being displayed on a viewing screen at the end-user device 170. The update may be generated by the corresponding fingerprint server and then communicated to the end-user device 170 or may be received by the corresponding RTFS from the real-time event manager 110 and/or from another portion of the ACR system 100 and then communicated to the end-user device 170.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 170. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the fingerprint servers 120 may be operable to communicate fingerprint profiles and/or fingerprint profile updates to the end-user devices 170 through the fingerprint matching systems 130. Feedback and/or queries from the end-user devices 170 may be received by the fingerprint servers 120 for processing. The fingerprint servers 120 may in turn communicate information corresponding to the feedback and/or queries from the end-user devices 170 to the real-time event manager 110 and/or to another portion of the ACR system 100 for further processing.

The fingerprint matching systems 130 may comprise suitable logic, circuitry, code, and/or interfaces that may be operable for matching fingerprints produced by the fingerprint servers 120 with fingerprints produced by the end-user devices 170. Each of the fingerprint matching systems 130 may correspond to a particular ACR or fingerprint technology. In this regard, each of the fingerprint matching systems 130 may be supported by a third party such as a TV manufacturer, for example. Additionally, one or more of the fingerprint matching systems 130 may be a hosted service (e.g., cloud computing, etc.) accessible via the Internet.

The fingerprint servers 120 may be operable to send fingerprints, interactive event IDs and other information to their corresponding fingerprint vendors (fingerprint matching systems 130) through one or more networks (e.g., wireline networks, optical, hybrid fiber coaxial (HFC), wireless networks) and/or by utilizing one or more communication protocols. Communication between the fingerprint servers 120 and the fingerprint matching systems 130 may occur through one or more wireless and/or wireline communication links. The communication links described above may support one or more communication protocols. Accordingly, the fingerprint servers 120 and the fingerprint matching systems 130 may comprise suitable logic, circuitry, code, and/or interfaces to enable the use of the appropriate communication protocols.

The fingerprint matching systems 130 may be operable to compare fingerprints produced by the end-user devices 170 with fingerprints provided by the fingerprint servers. When a match occurs, a fingerprint matching system 130 may indicate that an interactive event is to take place in an end-user device 170. These interactive events may allow a viewer of an end-user device 170 to be presented with information on the screen or display of an end-user device (such as an interactive poll, questions related to a focus group, or other questions or prompts for interaction) and may allow a viewer to interact with the information presented.

Communications between the fingerprint matching systems 130 and the end-user devices 170 may occur through one or more wireless and/or wireline communication links. The communication links described above may support one or more communication protocols. Accordingly, the fingerprint matching systems 130 and the end-user devices may comprise suitable logic, circuitry, code, and/or interfaces to enable the use of appropriate communication protocols.

The end-user devices 170 may comprise a plurality of devices such as connected TVs, connected TV with paired handheld/mobile devices (also referred to as second-screen devices) such as smartphones, PDAs and tablets, for example. End-user devices may also be referred to as media devices, where an end-user device may be a media device that is utilized by a user to communicate with a system, such as an ACR system. The End-user devices may also be referred to as viewer devices, display devices, or ACR-based devices, for example. In a particular end-user device setup, for example a setup in a viewer's home, one or more devices may be connected to a system 100. Each device in a setup may be connected to the system via a network 160, or via a separate end-user device that is part of the same setup. For example, a viewer may have a setup that includes a smart TV that connects to system 100 via network 160, and the viewer may also have a tablet (or other second-screen device) that communicates with the smart TV and allows the viewer to interact with content that is displayed on the smart TV. In some instances, the content displayed on such a second-screen device may coincide with the content that is displayed on the main end-user device, and this coincided content may allow a user or viewer to interact with content displayed on the main end-user device in a synchronized manner. In instances when a secondary or paired device that supports a particular fingerprint technology is used, that device may also be able to communicate with the corresponding fingerprint match system 120 that supports the compatible fingerprint technology.

The end-user devices 170 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 170 may be operable to receive a series of fingerprint profiles and/or fingerprint profile updates and may be operable to adjust ACR fingerprinting accordingly.

The ACR module 172 may comprise suitable logic, circuitry, interfaces and/or code that may be operable to provide various functionality and/or services comprising synchronous event manager functionality, fingerprint capture services, logo detection, and/or user initiated event detection.

Additional details of an exemplary ACR system that utilizes an abstraction layer may be found in U.S. patent application Ser. No. 13/730,359, filed on Dec. 28, 2012, which is hereby incorporated herein by reference.

Figure 2:
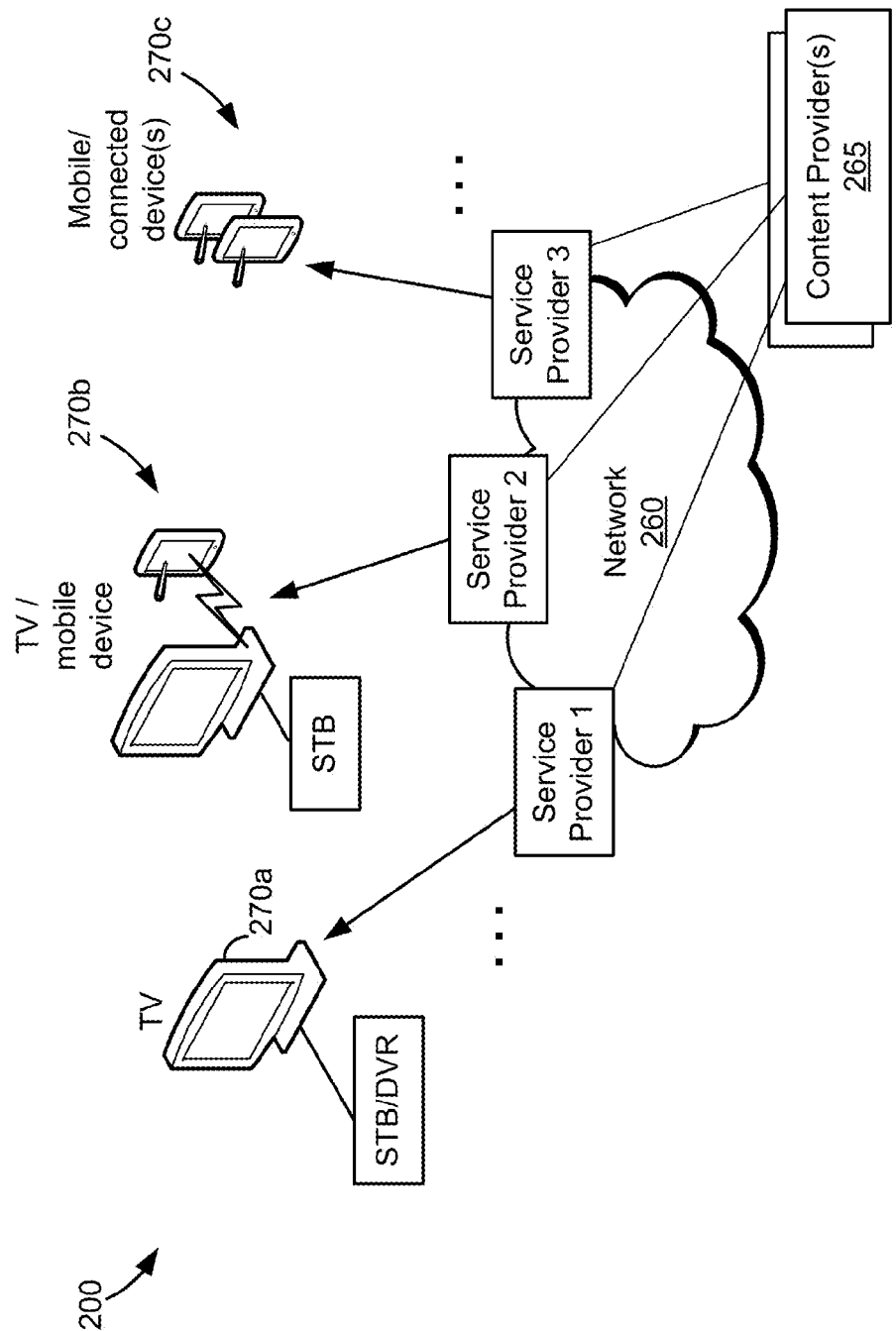
FIG. 2 is a high-level block diagram that shows a portion of an exemplary dial testing and audience response system, in accordance with one or more embodiments of the present invention.

FIG. 2 is a high-level block diagram that shows a portion of an exemplary dial testing and audience response system, in accordance with one or more embodiments of the present invention. As shown in FIG. 2, various end-user devices (media devices) such as connected (smart) TVs, some with paired hand-held (second-screen) devices, and even hand-held devices only may be connected via a network to an ACR system (for example, the system 100 of FIG. 1). In one setup, a single smart TV (device 270a) may be connected to an ACR system via, for example, a set top box (STB), a DVR or other device that may receive service from service provider 1. In another setup, multiple devices 270b may be connected to an ACR system, for example where one device, such as a smart TV may be the primary end-user device, and one or more hand-held devices, such as tablets, PDAs or smart phones, may be second-screen devices. In some embodiments of the invention, the TV/mobile device 270b may comprise a TV, which may be coupled to a STB that may receive service from service provider 2. A second-screen device associated with the connected TVs may be a tablet (e.g., iPad, Samsung Galaxy, etc.), smartphone (e.g., iPhone, Android, etc.), or other like device, for example. In this setup, the second screen devices may either be in communication with the network directly, or they may be in communication with the network via the primary device, or both. It should be understood that in any particular setup, not all of the devices need be ACR-enabled devices. In some examples, one of the devices may an ACR-enabled device and the other may not be ACR-capable, but may still interact with the ACR-enabled device. Therefore, throughout this disclosure, whenever reference is made to an ACR-based device in a setup, it should be understood that not all of the devices need be ACR-capable. Devices in a setup may also be referred to as media devices. Furthermore, throughout this disclosure, whenever reference is made to a single end-user device in a setup, it should be understood that the setup may contain multiple end-user devices, and vice versa with respect to references to multiple end-user devices. In another setup, devices (mobile/connected device(s)) 270c, which may receive service from service provider 3, which in some situations, may operate as second-screen devices, and may act as one or more primary end-user devices. In this setup, one or more second-screen devices may receive broadcast feed content and may also allow one or more users to interact with interactive events sent over the network. The devices (mobile/connected device(s)) 270c may also comprise Smart TVs whose content is delivered via IP instead of via a STB. Each of the service providers, namely service provider 1, service provider 2 and service provider 3 may possess its own distribution delay. The service providers, namely service provider 1, service provider 2 and service provider 3 may receive, for example, live and/or broadcast content from one or more service providers, for example, service provider 265.

As explained above, referring to FIG. 1 as an example, different end-user devices 170 may support different fingerprint technologies, and each fingerprint matching system 130 may support a different ACR or fingerprint technology. Therefore, an ACR system may include a number of fingerprint servers 120 operable to utilize different fingerprinting technologies as well.

Figure 3:
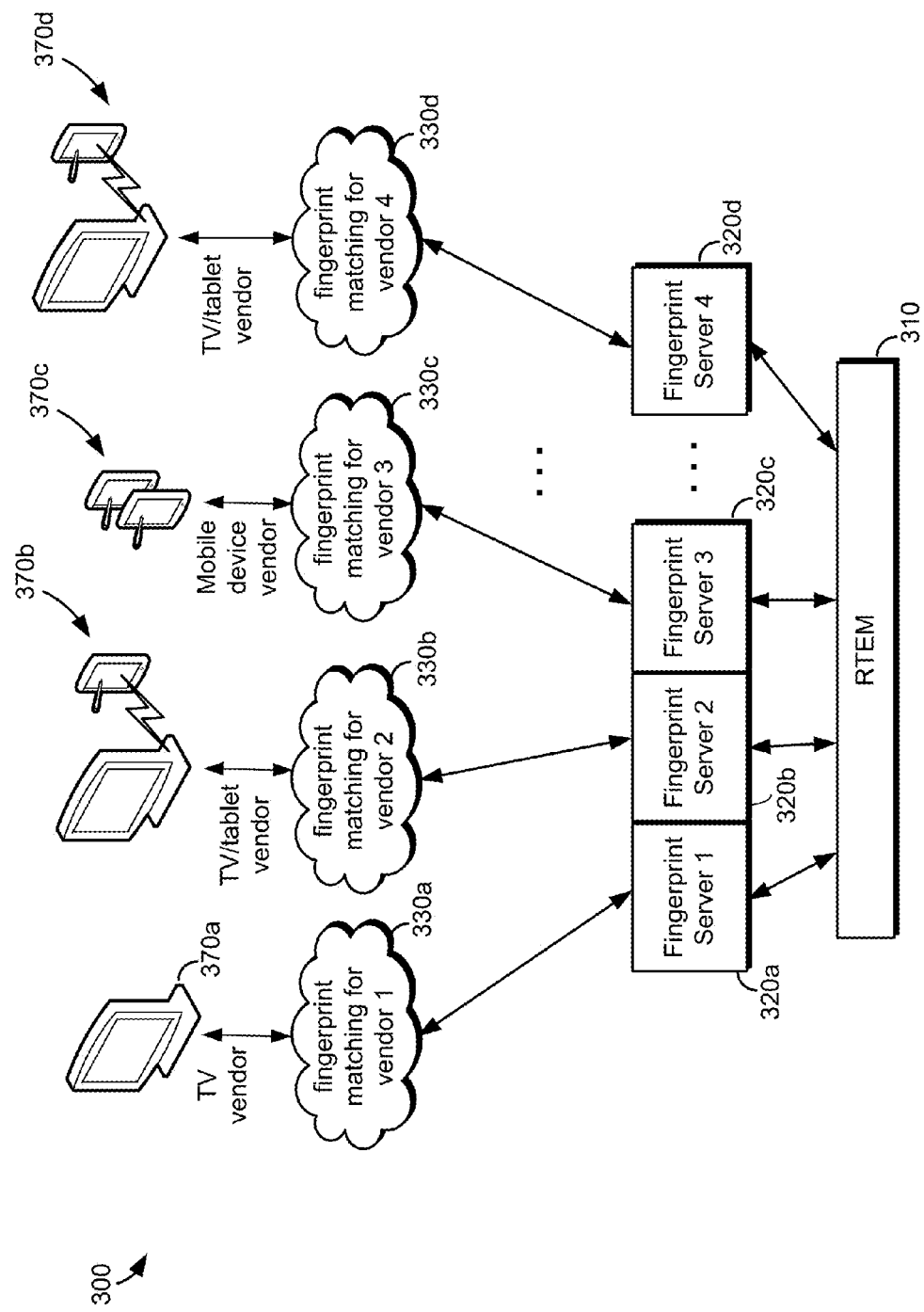
FIG. 3 is a high-level block diagram that shows a portion of an exemplary dial testing and audience response system, in accordance with one or more embodiments of the present invention.

FIG. 3 is a high-level block diagram that shows a portion of an exemplary dial testing and audience response system, in accordance with one or more embodiments of the present invention. As shown in FIG. 3, each end-user device (devices 370a, . . . , 370d) may utilize a different fingerprint technology, and therefore each end-user device may require its own fingerprint matching system (systems 330a, . . . , 330d). Accordingly, an ACR system may be operable to include fingerprint servers capable of communicating with some or all of the different fingerprint matching systems supported by the system. FIG. 3, shows how fingerprint servers 320a, . . . , 320d may be operable to communicate with distinct fingerprint matching systems 330a, . . . , 330d. These features may be implemented by having a central video fingerprint repository and management platform that facilitates triggering interactive events across various platforms regardless of the ACR vendor solution (e.g., fingerprinting technology). Such a system may be scalable and additional ACR vendor solutions may be added. An real-time event manager 310 may be operable to assign one or more interactive event identifiers to the different sets of video fingerprints (for example utilizing different fingerprint technologies) generated by the fingerprint servers 320a, . . . , 320d.

End-user devices may utilize the same video/audio fingerprinting technology utilized by the fingerprint servers and supported by fingerprint matching system vendors. The fingerprint vendor may be a vendor, manufacturer, or other third-party service provider that may comprise suitable logic, circuitry, code, and/or interfaces operable to provide hosted services over the Internet for the viewer devices. These services may comprise video and/or audio fingerprint matching as well as the delivery of any interactive event IDs associated with a match. The end-user devices may comprise suitable logic, circuitry, code, and/or interfaces that may be operable to take and send fingerprints to the fingerprint vendor for matching.

End-user devices may comprise an ACR service or platform that enables the device to perform one or more functions that may allow the end-user device to operate within the ACR system and may allow the end-user device to execute one or more interactive events. In some examples, the ACR service may be active and running directly on connected devices whenever the devices are operating within the system, and the ACR service may invoke an application framework, which may include system API's. One function that an ACR service may perform is to "listen" for or detect actionable events (for example, interactive events) and then act upon the events according to rules defined in a corresponding interface definition. Another function that an ACR service may provide is to receive and/or collect user responses (in response to an interactive event, for example) and pass response data to an application, service or external entity (such as a server, service, URL, or the like).

End-user devices, for example utilizing an ACR service, API's, an application framework, and other interface, circuitry, software and the like, may be operable to present applications to a viewer. For example, an end-user device may be operable to present text (including customized formatting, including new lines, pages, fonts and the like), window borders, wrappings and other graphics. Additionally, an end-user device may be operable to present customized overlay windows, for example designed by third parties. An end-user device may be adapted to present brand graphics and messages, sponsorship text and logos, graphs and other feedback images (e.g., user response results from a poll).

End-user devices may also be equipped with one or more cameras, web-cams or the like. A camera may be utilized by an application running on the end-user device to detect behavioral expressions, emotions, gestures and the like exhibited by viewers of an end-user device in response to live broadcasted content. Techniques of the present invention may be employed to synchronize these viewer behaviors with the precise timing of the content (such as live programming) that the viewer was watching.

Referring again to FIG. 1, system 100 may include one or more application servers 140 (also referred to as app servers for short). It should be understood that a system may include more than one application server, even though some of the descriptions throughout this disclosure may refer to a single app server in order to describe certain aspects of the systems and methods of this disclosure. The app server 140 may comprise suitable logic, circuitry, code, and/or interfaces that may be operable to store or host (or contain address information related to the location of) one or more applications or interactive events. It should be understood that the in some setups, an end-user device may have an application installed prior to the time that a fingerprint match is detected related to that device. In this setup, the application server may push an interactive event that displays and/or executes on the pre-installed application. In other setups, the application itself may be pushed to the end-user device and the end-user device may be operable to handle and/or execute the application and interactive event. Various configurations may exist with respect to the end-user devices and the application server such that portions of the code, for example, required to execute an interactive event on an end-user device may be pre-installed on the end-user device. Therefore, throughout this disclosure, when reference is made to an application or an interactive event being pushed or communicated from an application server, it may be understood that the application, or portions thereof, may be pre-installed on the end-user device. Alternatively, the application server may push the application including the interactive event together.

App server 140 may be operable to receive from an end-user device information related to an interactive event ID. The information may be provided by the end-user device in response to a match between a fingerprint taken by the end-user device and a fingerprint taken by a corresponding fingerprint server. In some embodiments of the present disclosure, the app server 140 may receive information related to an interactive event ID directly from a fingerprint matching system 130 instead of or in addition to receiving information from an end-user device. Thus, in this regard, the end-user device may prompt the app server 140 for content, or the app server 140 may push the content to the end-user device without being prompted by the end-user device. Therefore, throughout this disclosure, whenever reference is made to the end-user device requesting content from an app server, the app server may actually push the content to the end-user device, and vice versa with respect to references to app servers pushing content.

In operation, once a match occurs in one of the fingerprint matching systems 130 and the end-user device 170 (and/or the app server 140) obtains the appropriate information from its corresponding fingerprint vendor, the app server 140 then sends the appropriate content (such as an application or interactive event) to the end-user device that corresponds to the interactive event ID. The end-user device may communicate interactive event ID information to the app server 140 in order to request content or content may be pushed by the app server 140 to an end-user device without the device requesting it. In some embodiments, in order for an end-user device to accept content from an app server 140, the device has to be logged in to an appropriate network-connected application, web page or the like. Additionally, the end-user device may need to have an appropriate ACR service running on the device.

The interactive director 150 may comprise servers, computers, devices, user interfaces and the like that allow for interaction between an administrative user (such as a partner or a poll, trivia, focus group creator, director, etc.) and the system 100. In one example, the interactive director 150 may include an end-user computer and peripheral devices and/or interfaces such that an individual (such as a partner or a poll, trivia creator, director, etc.) may communicate with system 100 via the computer and peripherals/interfaces. The interactive director 150 may include peripherals and/or interfaces whereby a partner that is responsible for creating content that appears on end-user devices may create interactive events on the fly that synchronize to a live broadcast feed. The interactive director 150 may then communicate with an real-time event manager 110 to assign interactive event IDs to fingerprints associated with live programming. For live content, for example, the interactive director may determine when to trigger a poll question or other invitation to interact, to engage viewers. The network television feed may comprise network time reference information (e.g., a network timestamp) utilized to synchronize interactive event identifiers to the different video fingerprints. The interactive director 150 may also be operable to receive information from the network/broadcast feed.

In some embodiments of the present invention, a media timeline may be created to assist with synchronization instead of or in addition to network time information (e.g., a network timestamp). The media timeline may be generated by a component that analyzes pre-recorded content. The media timeline may comprise a number of interactive event identifiers, each of which corresponds to a particular time in the timeline.

In some embodiments of the present invention, the interactive director may be combined with other components that are adapted to assign interactive event IDs to fingerprints associated with live programming. For example, in contrast to an individual assigning interactive event IDs on the fly, the system 100 may include a component that is adapted to assign interactive event IDs based on analyzed and archived pre-produced content. For example, a component may analyze and store an episode of a TV show and may pre-determine when in the episode an interactive event is to take place (for example, when to push a poll or trivia question, when to push a fun fact, when to drive social engagement, and/or when to share a clip or post a comment).

In operation, once the interactive director 150 communicates with the real-time event manager 110 to assign interactive event IDs to fingerprints associated with live programming, the real-time event manager 110 may generate and/or handle event identifiers or event triggers that correspond for specific times in a program. The event identifiers may be assigned to the appropriate fingerprints generated by the fingerprint servers 120. The real-time event manager 110 may facilitate synchronization to appropriately assign the event identifiers to the right spot on a video and/or audio sequence.

Each of the fingerprint servers 120 may then communicate the event identifiers (generated or handled by real-time event manager 110) and the fingerprints to its corresponding one of the fingerprint matching systems 130. The fingerprint matching systems 130 in turn receive fingerprints from their corresponding end-user devices 170 and try to match those fingerprints to the ones received from their corresponding fingerprint servers 120. When a match occurs, the event identifier and/or other information may be passed to the appropriate end-user device (and/or to an application server 140). Based on information determined by the fingerprint matching system 130, the end-user device may obtain, for example, interactive information (e.g., graphics, poll questions) from the app server 140. There may be other actions performed by the user in connection with the interactive event and/or other information presented or produced in connection with the interactive event.

Figure 4:
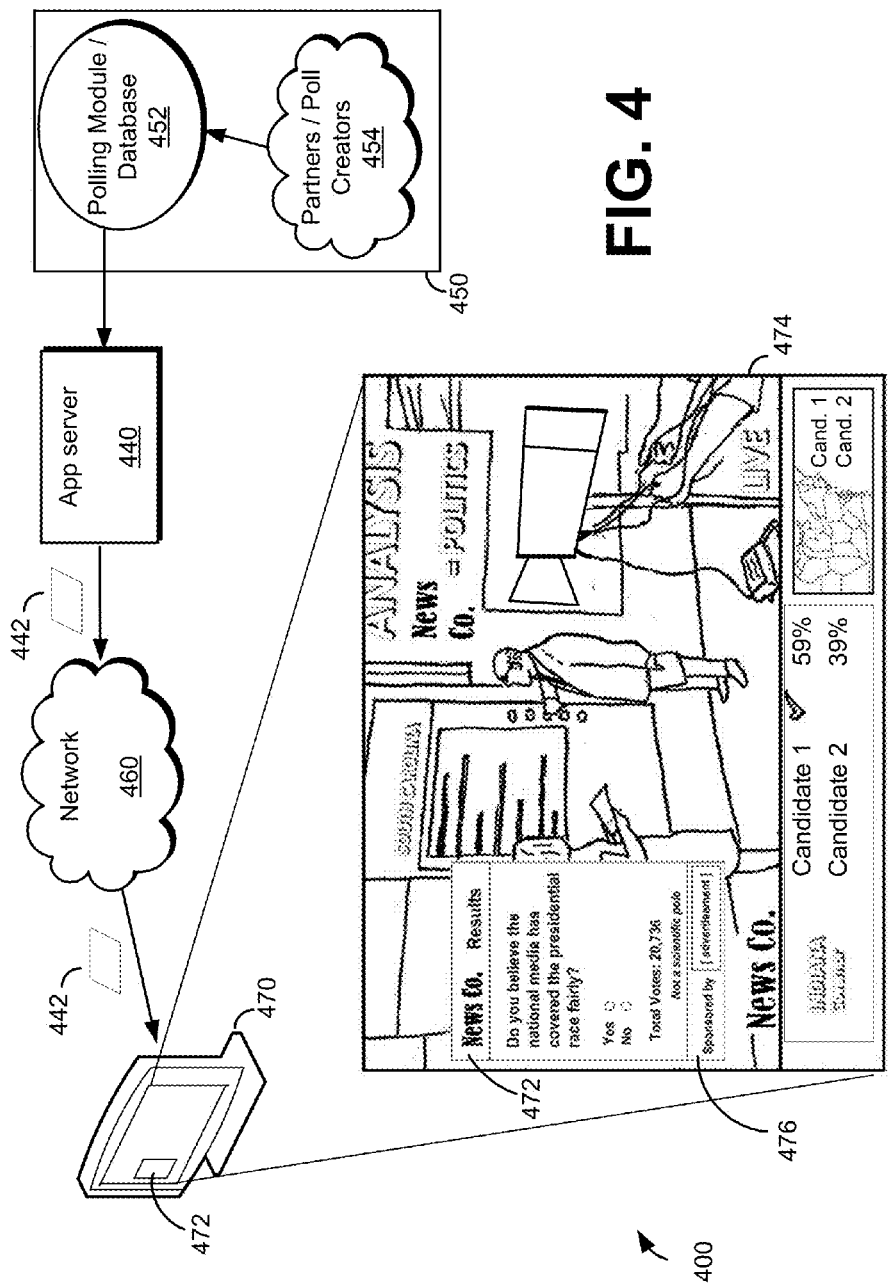
FIG. 4 is a high-level block diagram that shows a portion an exemplary dial testing and audience response system and an exemplary flow of information, in accordance with an embodiment of the present invention.

FIG. 4 is a high-level block diagram that shows a portion an exemplary dial testing and audience response system, in accordance with an embodiment of the present invention. FIG. 4 also illustrates the flow of information that may occur when the interactive director 450 initiates an interactive event related to live programming and causes that event to be displayed on network-connected end-user devices. The interactive director 450 may include interfaces that enable a partner 454 (for example a live poll creator or a focus group director) that is responsible for creating content that appears on end-user devices (for example, device 470) to create, enable or assign interactive events on the fly that relate to a live broadcast feed. Accordingly, a partner 454 may engage with an interface that is part of the interactive director 450 in order to initiate communications with an application server 440. For example, the partner may interact with a computer that is connected to the application server 440, where the computer includes certain modules, programs and the like that may facilitate the partner's 454 interaction with the app server 440.

In the example shown in FIG. 4, the partner 454 may want to initiate a live political poll related to a live news broadcast or program. The partner 454 may interact with a polling module 452, program, database or the like (for example executed on a computer) that may allow the partner 454 to specify which applications and/or interactive events the app server 440 should push to network-connected end-user devices. For live content, for example, the interactive director may determine when to trigger a poll question or focus group question to engage viewers. In one example, a partner 454 may be able to interact via a computer with a polling GUI (graphical user interface) that may allow the partner to easily monitor live programming and select appropriate interactive events that are synchronized with time points in the live content. The live broadcast feed that is sent to end-user devices may be delayed (for example, by a few seconds) compared to the broadcast feed that an interactive director 450 or a partner 454 may see, such that the partner may choose times in the live programming that may trigger an interactive event before the time that marked content passes by viewers of end-user devices.

The app server(s) 440 may be operable to handle data sent from various devices and modules within the interactive director 450. When the app server 440 receives a signal (and an interactive event ID) from an end-user device (or for example from a fingerprint matching system), the app server 440 may send application data 442 to one or more end-user devices 470. App server 440 may send application data 442 to an end-user device 470 in response to receiving a signal (and an interactive event ID) from the device 470 for example. The app server 440 and/or the interactive director 450 may also be operable to integrate with a variety of back-end systems, for example to integrate external polling servers (not shown) into the system.

The application data 442 may comprise, but need not be limited to, text, banners, shapes, graphics, overlays, sidebars, applications, widgets, and/or video, for example. The application data 442 may also comprise computer code, applications or other interactive elements that when executed by an end-user device, may present content to a viewer and allow a viewer to interact with an interactive element. The application data 442 may be synchronized with content that is currently (or was recently) displayed on the end-user device. In one example, when the application data 442 in sent to an end-user device 470, the end-user device may display an overlay window 472 that takes up a portion of the full display 474. In this example, the full display 474 may show live programming related to a news show or an ongoing political race, for example, and the overlay window 472 may display a poll that is synchronized with the live programming. One example poll may ask the viewer of the end-user device to share their opinion about an event that just occurred in the live programming. The overlay window 472 may also include reserved sections 476, for example sections that are reserved for advertisements, sponsors, network messages or other purposes.

As illustrated, for example, in FIG. 4, an interactive event, such as a poll, may solicit a viewer response. In one example, the poll may solicit user response via a multiple choice question, although other types of responses are contemplated, such as text responses. Once a viewer sees the interactive element on the screen of an end-user device, the user may interact, for example by responding to a poll by choosing one of the choices in a multiple choice question. The selection of a particular choice may be made utilizing a remote control and/or a second-screen device, for example.

Another exemplary embodiment of the invention may comprise a real-time response to a speech or comment that is made by a political candidate. In this regards, on the primary screen, a reaction bar or know may enable sampling across millions of TVs, which are geographically dispersed. This is in contrast to traditional dial testing where viewers must be gathered into a single room or viewing location. The ACT system 100 is operable to synchronize the corresponding viewer responses with the exact point in the content.

In accordance with various exemplary aspects of the invention, results from the real-time speech/comment may be shown as illustrated and described with respect to FIGS. 6A-6E. In this regard, the results may be displayed with sponsorship and delayed and displayed after a commercial break.

Figure 5:
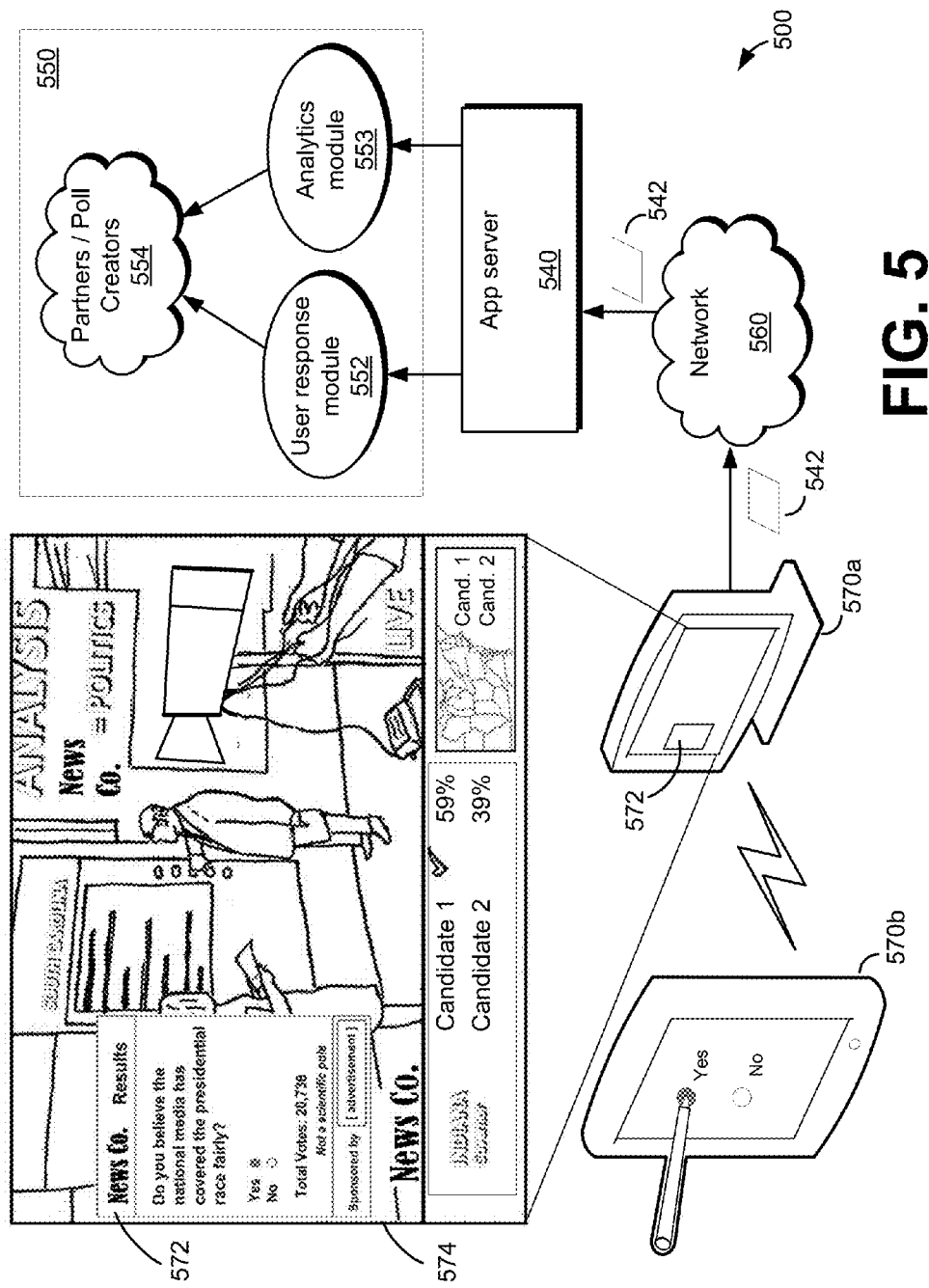
FIG. 5 is a high-level block diagram that shows a portion of an exemplary dial testing and audience response system and an exemplary flow of information, in accordance with an embodiment of the present invention.

FIG. 5 is a high-level block diagram that shows a portion of an exemplary dial testing and audience response system, in accordance with an embodiment of the present invention. FIG. 5 also illustrates the flow of information that may occur when a viewer of an end-user device interacts with an interactive event related to live programming and causes that a response to be sent to a partner, such as a poll creator. Part or all of one or more responses sent by an end-user device in response to an interactive event may be referred to as user response data. The example depicted in FIG. 5 includes a two-device (devices 570a, 570b) setup. In this example, once a viewer sees an overlay window 572 on the screen of their end-user device (device 570a and/or 570b), the viewer may interact with the related application or interactive element via a second-screen device 570b, such as a PDA, tablet or smart phone. In this example, the user may have an application installed on the second screen device 570b that enables the user to see displays, information and interactive choices that coincide with the overlay window 572 on the screen of the end-user device 570a. The viewer may then select a choice (or otherwise indicate a response) by interacting with the second-screen device 570b, for example by pressing on the screen with a stylus or the viewer's finger, or by pressing buttons on the second-screen device.

As one example, depicted in FIG. 5, it can be seen that the screen of second-screen device 570b may display interactive choices that coincide with the choices displayed in the overlay window 572. A viewer may then indicate a response using the second-screen device 570b, for example, by selecting a button labeled "Yes." In the example illustrated in FIG. 5, when the viewer selects "Yes" on the second-screen device, the same choice appears as selected in the overlay window 572. The second-screen device 570b may communicate the viewer's response to the end-user device 570a by a variety of connections such as a wired connection and/or a wireless connection (e.g., WIFI, Bluetooth, infrared, and the like).

Once a user responds to an interactive event, such as a poll, user response data 542 may then be transmitted to a partner 554 via a network 160. The user response data 542 may comprise, but need not be limited to, answers to poll questions, answers to trivia questions, text responses and the like. End-user devices may also be equipped with a camera, webcam or the like. The camera may be utilized by an application running on the end-user device to detect behavioral expressions, emotions, gestures and the like exhibited by viewers of an end-user device in response to live broadcasted content. Techniques of the present disclosure may be employed to synchronize these viewer behaviors with the precise timing of the content that the viewer was watching. Therefore, user response data 542 may comprise pictures, video and/or sounds exhibited by a viewer of an end-user device. In some instances, the user response data 542 may comprise processed information related to the viewer behavior such as behavioral recognition data.

An end-user device 570a may transmit response data 542 via a network 560 to a data server. In one example, the data server may be the same app server 540 that transmitted the application data and/or interactive event to the end-user device. However, in some embodiments of the invention, the end-user device may be operable to transmit response data to other servers and devices in addition to or instead of the app server 540.

The app server 540 may be operable to handle a flow of user response data 542 and may transmit the response data to third-party partners 554, such as poll creators, or to third-part servers. Communication of the user response data between the app server 540 and the partners 554 may be handled by one or more modules, interfaces and/or peripherals in the interactive director 550 such as, for example, a user response module 552. In one example, a partner 554 may interact with a computer that is connected to the application server 540, where the computer includes certain modules, programs and the like that may facilitate the partner's 554 interaction with the app server 540. The partner 554 may interact with a user response module 552, program, database or the like (for example executed on a computer) that may allow the partner 554 to view and analyze user response data. Viewer responses that result from interactive events may be handled by the user response module 552, which in turn communicates with third-party partners 554. Other modules in the interactive director 550 may be operable to automatically perform calculations, tabulations, graphing or other operations on the user response data in order to present accumulated response data to a partner.

The interactive director 550 may also comprise an analytics module 553 that may be operable to receive information from end-user devices (via network 560 and app server 540, or through some other interface and/or communication). The analytics module 553 may be operable to determine, for example, information about viewers who are interacting with content and what those viewers are watching. The analytics module 553 may also be operable to receive information from fingerprint vendors and/or fingerprint matching systems in order to determine information about types of end-user devices that are interacting with events. Collected responses and user information may be analyzed by, for example, the analytics module 553 and then sent to third-parties such as the third-party partners for analysis.

The app server 540 and/or the interactive director 550 may also be operable to integrate and/or communicate with a variety of back-end systems and databases, for example to integrate external analytics servers (not shown) into the system. The back-end systems and databases may be utilized to collect and provide user-engagement data. In some embodiments of the invention, the analytics module 553 may be implemented in an external back-end system, and analytics information may then be communicated between the back-end system and the interactive director 550. Communication to backend servers may use secure channels, for example SSL, https and the like.

In accordance with various exemplary aspects of the invention, results from the real-time speech/comment may be shown as illustrated and described with respect to FIGS. 6A-6E. In this regard, the results may be displayed with sponsorship and delayed and displayed after a commercial break.

FIGS. 6A and 6B are each diagrams that show exemplary window overlays (for example corresponding to the window overlay 472 shown in FIG. 4) that a viewer of an End-user device may see after the user submits a response to an interactive event. Referring to FIG. 6A, there is shown a diagram that shows an exemplary overlay window 600 that a viewer of an end-user device may see after submitting a response to an interactive event. Overlay window 600 may be presented to a viewer without any communication with an application server, which means that the overlay window 600 may be presented to a viewer before results from an interactive event are available. The content included in overlay window 600 may have been communicated to an end-user device when the interactive event was communicated to the device. In this respect, the end-user device may be able to present overlay window 600 to a viewer before results from an interactive event are available. The overlay window 600 may be just one example of an overlay window that may display on an end-user device before the results of an interactive event are available or in circumstances where no results may be communicated back to the viewer. Other examples of overlay windows may inform the user that no results may be communicated or that results may be communicated via contact information associated with a user account that the viewer set up in advance.

Results from an interactive event (also referred to as interactive event results) may be accumulated, tabulated, prepared and/or formatted at a variety of locations and within input from a variety of sources. For example, computers, modules, code, interfaces and the like included within the interactive director may be adapted to allow a partner (such as a poll creator or a focus group director) to view results accumulated from multiple end-user devices and make choices as to how to format the results and send the results back to end-user devices. In another example, computers modules, routines and the like may automatically tabulate and format the results and return them to end-user devices. The computers, modules, code, interfaces and the like that may aid in the tabulation and formatting of results may comprise the ACR system (for example system 100 of FIG. 1) or they may comprise separate systems that may be in communication with the ACR system, such as backend systems that are in communication with the ACR system via secure connections. In other examples, the computers, modules, code, interfaces and the like that may aid in the tabulation and formatting of results may be included in independent systems that may not be in communication with the ACR system. These systems may be designated as user response collection and response systems, for example.

The results from an interactive event may be presented to viewers of end-user devices in a variety of formats such as text, graphics, graphs, image collages, video, sound and the like. Applications that run on end-user devices may be operable to handle many different formats of interactive event results. In one example of a political poll, the results may be formatted in the form of a bar graph (see FIG. 6B), which shows the percentage of viewers that selected certain choices of a multiple choice question. In another example where a camera coupled to an end-user device captured user reactions, the results may be formatted as a collage of images that show a sampling of viewer reactions to a segment of live programming.

Referring to FIG. 6B, there is shown a diagram that shows an exemplary overlay window 610 that a viewer of an end-user device may see after the results of an interactive event have been tabulated and communicated back to the end-user device. The content of the overlay window 610 may be communicated to the end-user device via the same or similar information flow as depicted in FIG. 4. In this example using FIG. 4, the results of an interactive event may be accumulated and formatted in the interactive director 450 (for example) and may be transmitted to an end-user device 470 via a network 460, which may utilize one or more modules included in the interactive director 450 and may also utilize the app server 440 or some other connection to the network 460. At an appropriate time (for example within a specified time period after a poll question was displayed), the results from viewer responses may be displayed. The time period may be pre-designated to a relatively short period of time so that viewers can see results while the results are still synchronized with the content that the viewer is watching. In this respect, viewers may get virtually instantaneous feedback, reactions and results from a sampling of viewers or group of subscribers and/or members.

FIGS. 6C-6E are each diagrams that show exemplary window overlays (for example corresponding to the window overlay 472 shown in FIG. 4) that the viewer of an end-user device may see either during an interactive event, before or after. These exemplary window overlays will be referenced in order to describe additional options and features that may exist in some embodiments of a dial testing and audience response system.

FIG. 6C is a diagram that shows an exemplary overlay window that the viewer of an end-user device may see before an application displays content related to an interactive event. For example, if the ACR system detects that a viewer is watching a news show, a synchronized political poll interactive event may be communicated to an end-user device. Then, an overlay window may appear on the end-user device. The content of the political poll (for example, the question and answer choices) may not appear in the overlay window immediately. In some embodiments of the present invention, an opt-in overlay window 620 may appear, presenting the viewer with the options, for example to interact, to ignore or to close the overlay window. In one example, the viewer may opt to interact, and then the content (for example the poll) may display in the overlay window, or another application providing the content may launch. In another example, the viewer may opt not to interact and then no additional overlay windows or applications may be displayed. In some embodiments of the present invention, when a user selects a choice, for example to interact or not, the user may additionally be provided with an option to remember the user's preferences for future interactive events, for example applying to all events, or events on particular channels. In some embodiments of the invention, the preference may be stored and utilized for future reference. This storage of the preference may be transparent to the user.

In some embodiments of the invention, the end-user devices, or applications, may include a mechanism for viewers who prefer a default preference regarding overlay windows. The viewer may be able to establish different preference for opt-in events (for example, events that include an opt-in window like the one shown in FIG. 6C) and non-opt-in events. Default preference established by the user may be indicated to the application automatically without the user having to communicate with the application, and in some embodiments, the user may not see an overlay window as a result. For opt-in events, the viewer may indicate that that they never want to interact with the event, or the viewer may indicate that they only want to interact with events on certain networks and/or with certain types of events. For non-opt-in events, the viewer may indicate that they never want to see the event, the viewer may indicate that they only want to see events on certain networks, and/or the viewer may indicate that they only want to see certain types of events. Several other default options may be apparent to one of skill in the art. In some embodiments of the invention, regardless of the user preferences, the application may be designed in order to override user preferences. For these applications, overlay windows may appear to a viewer regardless of the default preferences that the viewer may have established.

FIGS. 6D and 6E are each diagrams that show exemplary overlay windows that the viewer of an end-user device may see either during an interactive event, before the interactive event, or after the interactive event. Referring to FIG. 6D, a user portion 630 of an overlay window may present status and options related to a user account. In some embodiments of the invention, a viewer or user's interaction with interactive events and/or overlay windows may be associated with a user account on a system. A user account may be of the type that currently exists in many web-based services. User account information, settings and data may be stored on a servers maintained by a service provider. The user may setup and/or register and manage his account via a web page or, in some embodiments, via an application running on a smart TV or other web-connected device.

The user portion 630 may be displayed on an end-user device either linked to a visible overlay window, or the user portion 630 may be displayed independently from another overlay window. The user portion 630 may, for example, inform the viewer of an end-user device of the username associated with the account that is currently active and associated with an application. The user portion 630 may also, for example, provide a viewer with a link or option to alter the user's account or account preferences. The user portion 630 may also provide a user with the option to log out of the currently active account or switch accounts. In some examples, if no current account is active (no user is logged in) on the end-user device, the user portion 630 may display an option for the user to login to his account or register a new account.

Referring to FIG. 6E, there is depicted a diagram that shows an exemplary overlay window or a portion of an overlay window, referred to here as a login portion 640 that presents login and register options to a viewer. Login portion 640 may, for example, be displayed on an end-user device in response to a viewer selecting an option to login or register (e.g., these options may have been available via the user portion 630 of FIG. 6D). Via the login portion 640, a viewer may login to his existing account by entering a username and password, for example. Additionally, the login portion 640 may present an option to register a new account.

User accounts may provide benefits, for example, convenience to a viewer and/or more comprehensive data to a provider. If a user prefers to interact with overlay windows and applications, a user account may provide a user with options to establish default preferences, logging capabilities, the ability to communicate with other users, the ability to view user response results on other web-connected devices, and many other account features that will be apparent to one of skill in the art. A partner (for example a poll creator) may benefit from user accounts. For example, if user response data is linked to accounts, it may be easier to track response data over time, for example to identify trends and the like.

Applications and overlay windows may include associated timing features. Components within an end-user device or within an application may implement these timing features. Timing features may affect the behavior of applications and overlay windows. For example, referring to FIG. 6C, an opt-in window 620 may be designed to only display for a certain amount of time, after which the window may disappear if the user does not opt to interact. In another example, referring to FIG. 4, an interactive event overlay window 472 may be designed to only display for a certain amount of time, after which the window may disappear if the user does not interact. In the example of a political poll that is synchronized to live election news coverage, it may be desirable to return the results of a poll to viewers within a relatively short period of time. In this example, the application may be designed to cut off user responses after this period of time so that the results can be tabulated. Network and/or content providers, third party partners and other parties may collaborate to determine time limits that are appropriate for various types of content. Additionally, the end-user devices may be required to meet certain performance metrics regarding display and response times in order to meet time requirements established in a system.

As explained above, various end-user devices such as connected (smart) TVs, some with paired hand-held devices, and even hand-held devices only, may be connected via a network to an ACR system (for example, the system 100 of FIG. 1). The ACR system may include a means whereby the applications communicated by the app server may execute properly on various types of end-user devices. For example, the vendor of the ACR system (for example, a network content provider) or a partner may provide an application framework or an API (application programming interface), and for example an SDK (software development kit) to aid in the development of applications. An API may be a specification (for example, computer code-based) intended to be used as an interface by components (for example, software components) to communicate with each other. An SDK may typically comprise a set of software development tools that allows for the creation of applications for a certain software package, software framework, hardware platform, computer system, operating system, or similar platform.

In FIG. 6A-6E, the results may be displayed with sponsorship and delayed and displayed after a commercial break.

Figure 7:
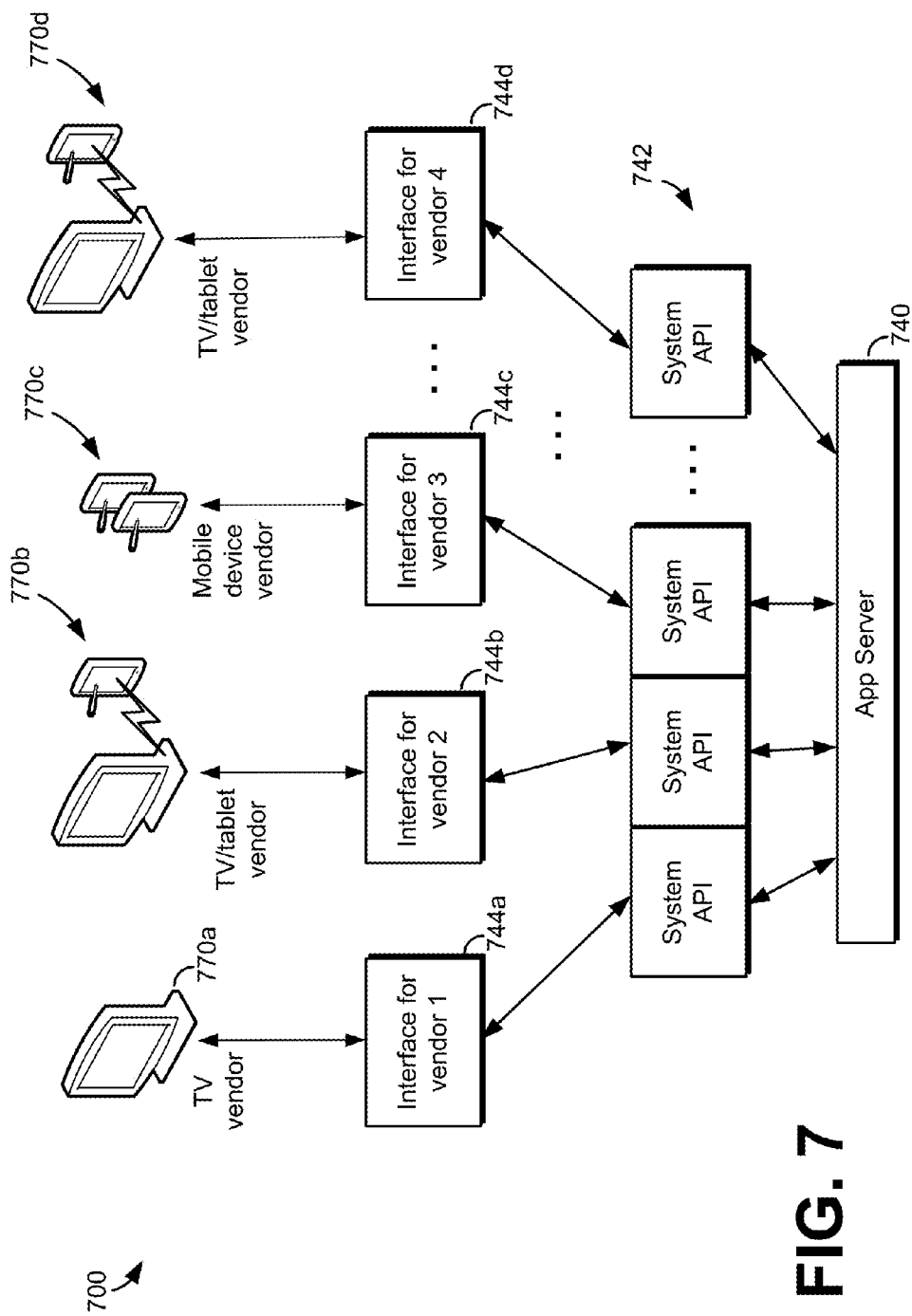
FIG. 7 is a high-level block diagram that shows a portion of an exemplary dial testing and audience response system, in accordance with one or more embodiments of the present invention.

FIG. 7 is a high-level block diagram that shows a portion of an exemplary dial testing and audience response system, in accordance with one or more embodiments of the present invention. As shown in FIG. 7, a variety of end-user devices 770a, . . . , 770d may be operable to properly execute applications served by app server 740 by way of a system API 742 and/or vendor-specific interfaces 744a, . . . , 744d. In one example, a vendor (for example, vendor 1) may acquire the system API 742 and then implement the system API 742 (along with additional vendor 1—specific interfacing) into the devices manufactured by the vendor. In this example, the system API 742 and the interface for vendor 1 744a may be implemented fully or substantially within devices manufactured by vendor 1. In another example, a vendor (for example, vendor 1) may provide a vendor-specific interface or API (such as interface 744a) to the operators of app server 740 (or other parties that are responsible for creating applications). In this example, operators or other parties may implement an API for each vendor, in which case the vendor interface 744a and system API 742 may be implemented within the app server 740, or related system components utilized to create and store applications.

API's that allow interfacing with various vendors may provide benefits. For example, an API may allow an end-user device to perform real time downloading and invocation of applications from the app server 740. Additionally, API's and/or vendor interfaces may establish a single framework (or container) that can be leveraged for various applications. For example, the framework may include functions that facilitate user response data to multiple locations (e.g., user response data could be sent to two distinct locations and/or servers), the address of which may be maintained by the system or network content provider. In another example, the framework may enable the invocation of overlay windows and applications, and may facilitate data communication between multiple applications and/or overlay windows, and between applications and an external entity, for example a third-party service. In another example, the framework may enable the communication of content, data and other information to and from second-screen devices.

Although throughout this disclosure, a political new show and a political poll is used as a common example to explain the application of dial testing and audience response system techniques described here, it should be understood that these techniques may be readily adapted to a variety of other programming, provided by a network for example. The programming may not be live coverage, such as a live news program. For example, the programming may be a movie that is being replayed, streaming over a network or broadcast feed. The dial testing and audience response system techniques described herein may still apply to replays of recorded content. In the example of a replayed movie, interactive events may be assigned to certain times in the movie, and applications synchronized to those times in the movie may be displayed on end-user devices. For example, an application may poll the viewers to solicit viewer interaction regarding what viewers believe will happen next in the movie. The application may ask viewers trivia questions related to actors or scenes that are currently being displayed in the movie. The application may also be utilized to track viewers emotions or feelings during the movie. Many other types of content provided by a network may utilize the techniques described herein.

Figure 8:
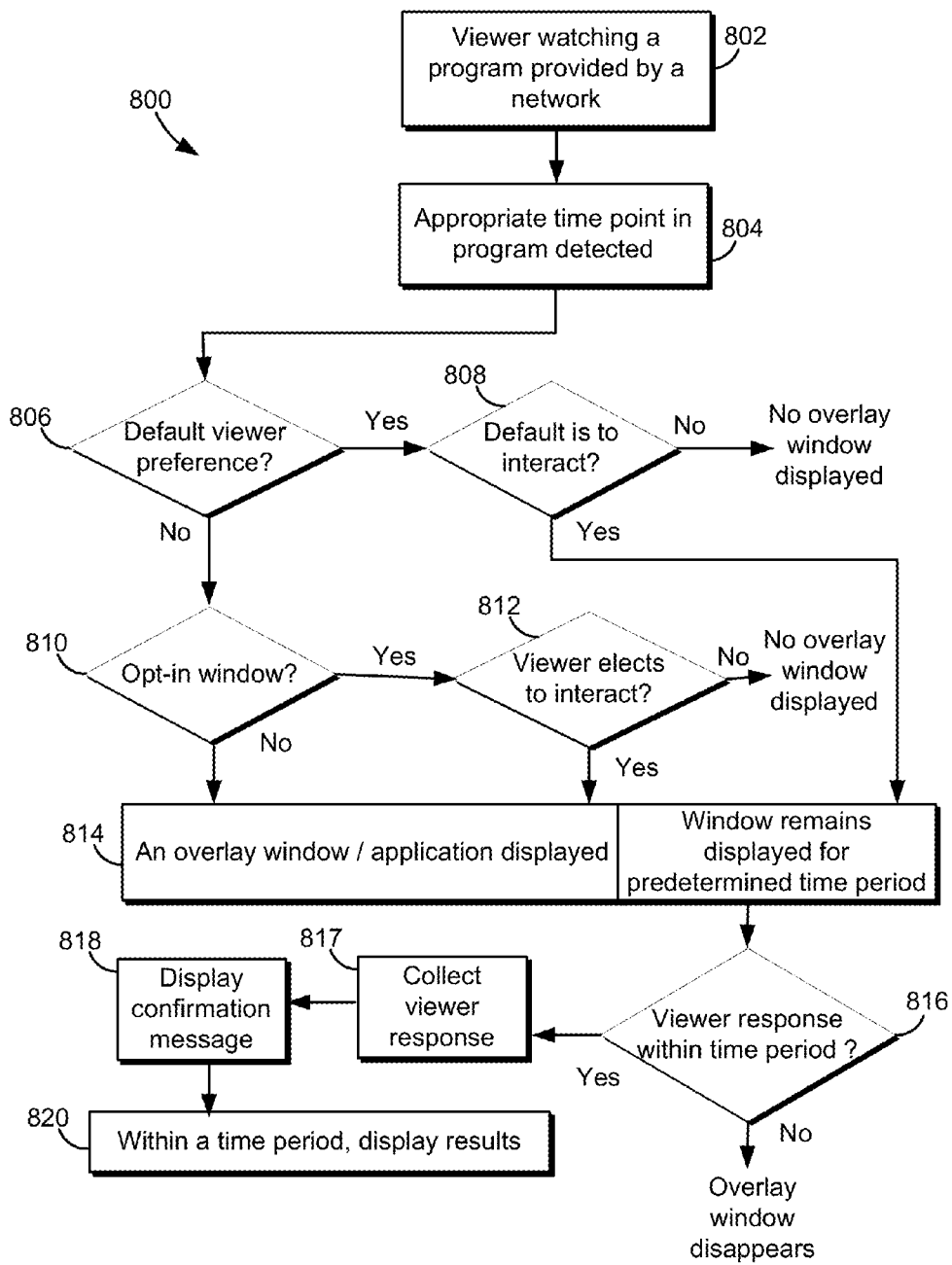
FIG. 8 is a flow diagram that shows exemplary steps in the operation of an exemplary dial testing and audience response system, in accordance with one or more embodiments of the present invention.

FIG. 8 is a flow diagram that shows exemplary steps in the operation of an exemplary dial testing and audience response system, in accordance with one or more embodiments of the present invention. At step 802, a viewer may be watching a program provided by a network and/or content provider. At step 804, an appropriate time point in the program may be detected, for example in response to the detection of a desired frame and/or scene of the program. The desired frame and/or scene may have been selected by an interactive director, reference to a programming timeline, or comparison to stored video content. At step 806, the viewer may have established default preferences related to whether they want to interact. If the viewer has established no user preferences, or if the application is designed to override user preferences, the flow may continue to step 810. If the viewer has established user preferences, the flow may proceed to step 808 where the viewer's preference is considered. If the viewer prefers not to interact, the viewer may see no overlay window. If the viewer prefers to interact, the flow may proceed to step 814.

At step 810, the application may offer an opt-in window. If there the application is a non-opt-in application, the flow may proceed to step 814. If the application provides and opt-in window, the flow may proceed to step 812 where the viewer may choose whether to interact with the application or not. If the viewer elects to not interact, the viewer may not see any overlay window. If the viewer elects to interact, the flow may proceed to step 814.

At step 814, an overlay window may be displayed, for example an interactive event or application such as a poll, a call to vote, or the like. At step 816, the overlay window may remain displayed for a determined time period. If a viewer does not respond to the interactive event within the time period, the overlay window may disappear. If a viewer responds to the interactive event within the time period, the flow may proceed to step 817, where the viewer response is collected. The flow then proceeds to step 818, where a confirmation message may display within a relatively short period of time, informing the viewer that the viewer's response has been submitted. At step 820, at an appropriate time (for example within a specified time period after the overlay window was displayed), the results from viewer responses may be displayed.

Figure 9:
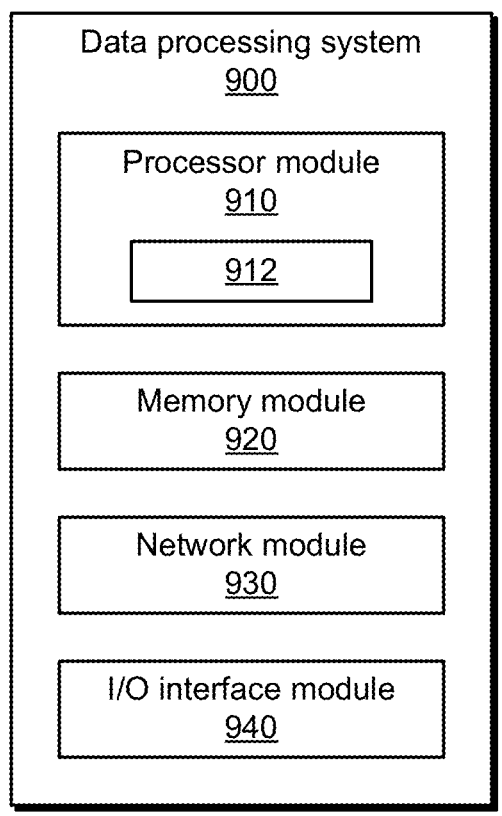
FIG. 9 is a block diagram that shows an example data processing system that may be used in accordance with one or more embodiments of the present invention.

FIG. 9 is a block diagram that shows an example data processing system that may be used in accordance with one or more embodiments of the present invention. Additionally, the systems, methods and/or techniques described herein may utilize more than one data processing system. For example, referring to FIG. 1, the fingerprint servers 120 may be realized in one or more data processing systems. The real-time event manager 110 may be realized in one or more data processing systems. The interactive director 150 may be realized in one or more data processing systems. The app server 140 may be realized in one or more data processing systems. The fingerprint matching systems 130 may be realized in one or more data processing systems. The end-user devices may include one or more data processing systems. Additionally, one or more of the components of system 100 shown in FIG. 1 may be realized within a single data processing system. One of skill in the art will realize that different combinations of data processing systems that realize components of system 100 may be provided without departing from the spirit and scope of the invention.

Referring to FIG. 9, there is shown a data processing system 900 that may correspond to one or more components of an example dial testing and audience response system. The data processing system 900 may comprise a processor module 910, a memory module 920, a network module 930, and an input/output (I/O) interface module 940.

The processor module 910 may comprise suitable logic, circuitry, code, and/or interfaces that may be operable to perform the operations, functions, processes, techniques, and the like, for example one or more of the operations, functions, processes and techniques described herein. In this regard, the processor module 910 may be operable to enable one or more components of a dial testing and audience response system. The processor module 910 may comprise at least one processing device 912. The processing device 912 may be a central processing unit (CPU), a digital signal processor (DSP), and/or other type of integrated circuit that may be utilized to perform data processing operations.

The memory module 920 may comprise suitable logic, circuitry, code, and/or interfaces that may be operable to store information utilized to enable an example dial testing and audience response system. The network module 930 may comprise suitable logic, circuitry, code, and/or interfaces that may be operable to allow the data processing system 900 to communicate with one or more other data processing systems (for example other data processing systems within the same dial testing and audience response system, or other data processing systems external to the same dial testing and audience response system). The network module 930 may be operable to support one or more communication protocols such as wireline protocols and/or wireless protocols. The I/O interface module 940 may comprise suitable logic, circuitry, code, and/or interfaces that may be operable to interact with one of more devices or other sources of interactive information such as interfaces or peripherals that allow interaction by a partner, or a device that allows a computer code to be loaded into the memory module 920 of the data processing system.

Figure 10:
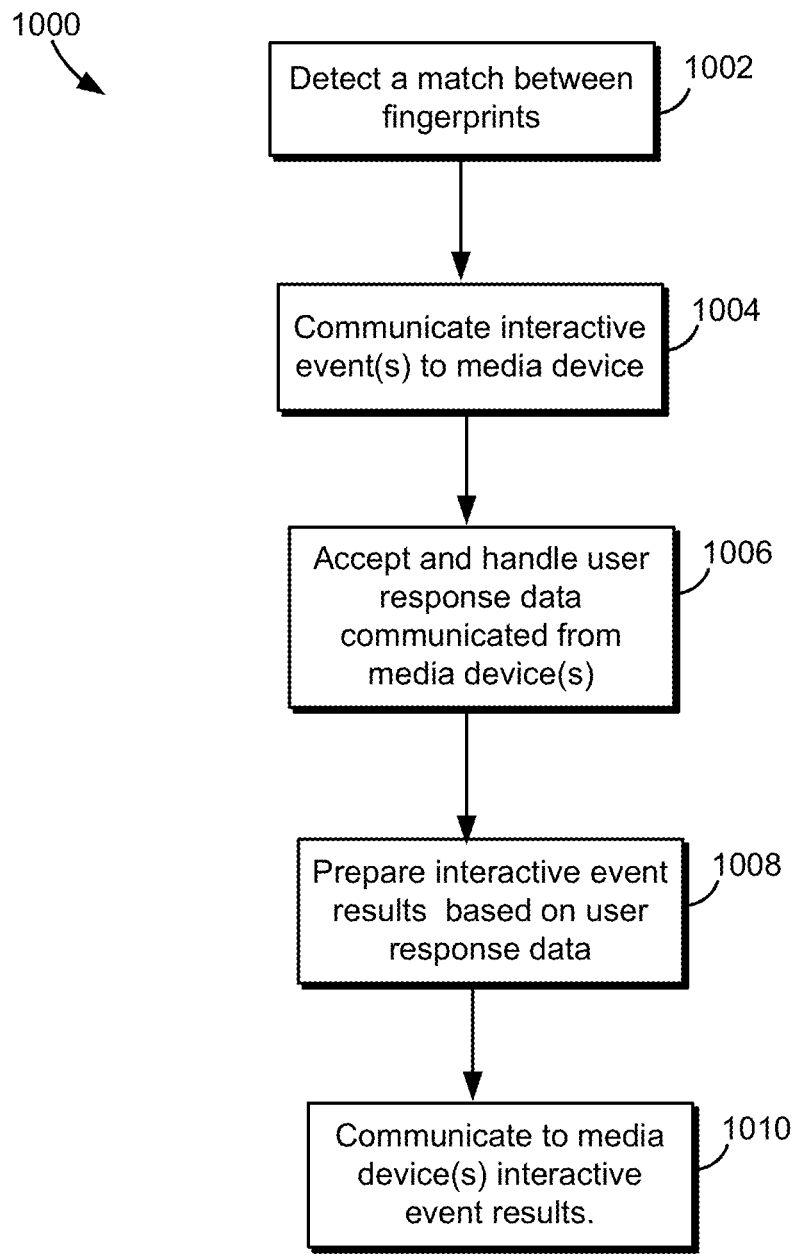
FIG. 10 is a flow diagram that shows exemplary steps in the operation of an exemplary content recognition system, in accordance with one or more embodiments of the present invention.

FIG. 10 is a flow diagram that shows exemplary steps in the operation of an exemplary content recognition system, in accordance with one or more embodiments of the present invention. An exemplary content recognition system (for example, an ACR system) may perform a method (for example, method 1000 of FIG. 10) that comprises the following steps in order to carry out one or more of the techniques of an exemplary dial testing and audience response system. At step 1002, the ACR system may detect a match between one or more video fingerprints corresponding to a first network television feed and one or more video fingerprints corresponding to a second network television feed. At step 1004, the ACR system may communicate, via an application server, one or more interactive events (such as a poll, focus group question, or the like) to a media device that is reading the second network television feed. The one or more interactive events may be operable to execute on the media device and may be displayed at a time that is synchronized to the second network television feed. At step 1006, the ACR system may accept and handle, via a server, user response data (such as the selection of one choice out of a multiple choice question) communicated from the media device. The user response data may correspond to one or more of the interactive events and may be synchronized to the second network television feed. Additionally, the one or more interactive events and the user response data may be synchronized to the second network television feed based on network time reference information.

At step 1008, the ACR system may prepare interactive event results (such as a graph representing polling results) based on the user response data communicated from the media device and user response data communicated from one or more other media devices. At step 1010, the ACR system may communicate to the media device the interactive event results. The interactive event results may be operable to display on the media device and may be operable to display at time that is synchronized to the second network television feed. The ACR system may accept and handle, via a server, analytics data communicated from one or more media devices or one or more fingerprint matching systems. At least part of the analytics data may indicate types of media devices that are interacting with the one or more interactive events. Next, the ACR system may indicate, via an interactive director, to the application server, the one or more interactive events that should be communicated to the media device. In some embodiments of the invention, the user response data may be associated with a user account on a system that supports a plurality of user accounts.

Figure 11:
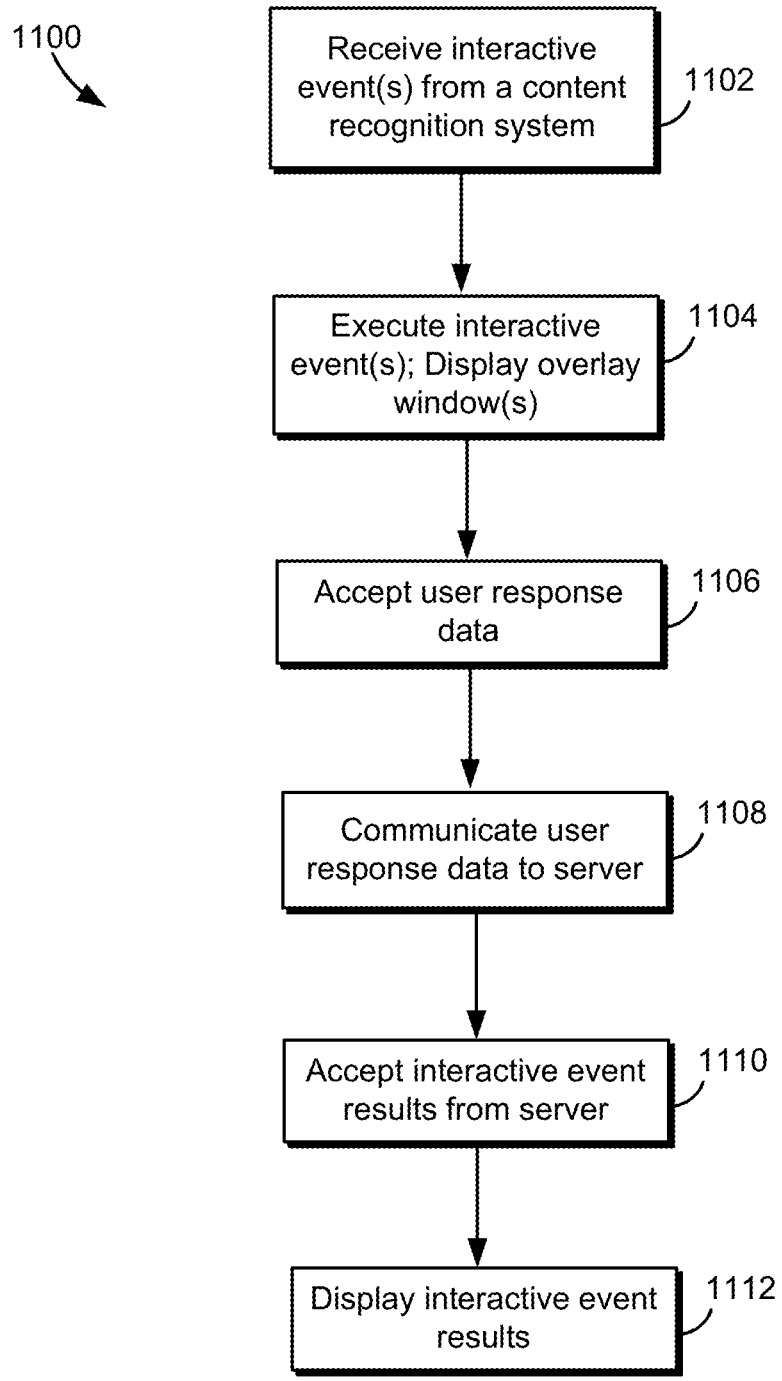
FIG. 11 is a flow diagram that shows exemplary steps in the operation of an exemplary media device, in accordance with one or more embodiments of the present invention.

FIG. 11 is a flow diagram that shows exemplary steps in the operation of an exemplary media device, in accordance with one or more embodiments of the present invention. An exemplary media device (or end-user device) may perform a method (for example, method 1100 of FIG. 11) that comprises the following steps in order to carry out one or more of the techniques of an exemplary dial testing and audience response system. In order to perform the following method and/or steps, the media device may be operable to read a network television feed. At step 1102, the media device may receive one or more interactive events from a content recognition system (for example, an ACR system). At step 1104, the media device may execute the one or more interactive events to perform displaying of one or more overlay windows. The displaying may occur at a time that is synchronized to the network television feed. At step 1106, user response data maybe accepted from a user during a time period that may be synchronized to the network television feed. At step 1108, the user response data may be communicated to a data server at a time that may be synchronized to the second network television feed. In some embodiments of the invention, the data server that accepts user response data may be the same application server that communicated the interactive event to the media device. The one or more interactive events may be operable to accept input from a user communicated via the media device (and/or the associated remote control) or via a second-screen device that is in communication with the media device.

At step 1110, the media device may execute the one or more interactive events so as accept interactive event results communicated from the data server. The interactive event results may be based on the user response data communicated to the system and on user response data communicated from one or more other media devices to the data server. At step 1112, the interactive event results (such as a graph representing the results of a poll) may be displayed at time that may be synchronized to the network television feed.

In some embodiments of the invention, the media device may, prior to displaying the one or more overlay windows, display an opt-in window that may provide a user with a choice regarding whether to interact with the interactive event, and accept input from the user, which may indicate whether or not to interact with the interactive event. In some embodiments of the invention, the one or more interactive events may utilize an application programming interface associated with an application developer.

Another embodiment of the present disclosure may provide a non-transitory machine and/or computer readable storage and/or media, having stored thereon, a machine code and/or a computer program having at least one code section executable by a machine, computer and/or data processing system, thereby causing the machine, computer and/or data processing system to perform the steps as described herein for synchronization of dial testing and audience response utilizing automatic content recognition.

Accordingly, the present disclosure may be realized in hardware, software, or a combination of hardware and software. The present disclosure may be realized in a centralized fashion in at least one machine, computer and/or data processing system; or in a distributed fashion where different elements are spread across several interconnected machines, computers and/or data processing systems. Any kind of machine, computer and/or data processing system or other apparatus adapted for carrying out the methods described herein is suited. A typical combination of hardware and software may be a general-purpose computer system with a computer program that, when being loaded and executed, controls the computer system such that it carries out the methods and techniques described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a content recognition system comprising an abstraction layer and one or more servers, the abstraction layer enabling:
assigning, by a real-time event manager based on a common network reference clock utilized by the content recognition system, same interactive event identifiers to different sets of fingerprints generated by different video fingerprint technologies;
the content recognition system enabling:
detecting a match between one or more video fingerprints corresponding to a first network television feed and one or more video fingerprints corresponding to a second network television feed;
communicating, by the one or more servers, one or more interactive events to a media device that is reading the second network television feed, wherein the one or more interactive events are operable to execute on the media device and are operable to display at a time that is synchronized, based on the common network reference clock, to the second network television feed; and
receiving and handling, by the one or more servers, user response data communicated from the media device, wherein the user response data corresponds to one or more of the interactive events and is synchronized, based on the common network reference clock, to the second network television feed.

2. The method according to claim 1, comprising preparing interactive event results based on the user response data communicated from the media device and user response data communicated from one or more other media devices.

3. The method according to claim 2, comprising communicating the interactive event results to the media device, wherein the interactive event results are displayed on the media device and are displayed at time that is synchronized, based on the common network reference clock, to the second network television feed.

4. The method according to claim 1, comprising accepting and handling, by the one or more servers, analytics data communicated from one or more media devices or one or more fingerprint matching systems, wherein at least part of the analytics data indicates types of media devices that are interacting with the one or more interactive events.

5. The method according to claim 1, wherein the one or more interactive events and the user response data are synchronized, based on the common network reference clock, to the second network television feed based on network time reference information.

6. The method according to claim 1, comprising indicating to the one or more servers, via an interactive director within the content recognition system, the one or more interactive events that should be communicated to the media device.

7. The method according to claim 1, wherein the user response data is associated with a user account on a system that supports a plurality of user accounts.

8. A system, comprising:
a content recognition system comprising an abstraction layer and one or more servers:
the abstraction layer being operable to assign, by a real-time event manager based on a common network reference clock utilized by the content recognition system, same interactive event identifiers to different sets of fingerprints generated by different video fingerprint technologies;
the content recognition system being operable to detect a match between one or more video fingerprints corresponding to a first network television feed and one or more video fingerprints corresponding to a second network television feed; and
the one or more servers being operable to:
communicate one or more interactive events to a media device that is reading the second network television feed, wherein the one or more interactive events are operable to execute on the media device and are operable to display at a time that is synchronized, based on the common network reference clock, to the second network television feed; and
receive and handle user response data communicated from the media device, wherein the user response data corresponds to one or more of the interactive events and is synchronized, based on the common network reference clock, to the second network television feed.

9. The system according to claim 8, wherein the content recognition system is operable to prepare interactive event results based on the user response data communicated from the media device and user response data communicated from one or more other media devices.

10. The system according to claim 9, wherein the content recognition system is operable to communicate to the media device the interactive event results, wherein the interactive event results are displayed on the media device and are displayed at time that is synchronized, based on the common network reference clock, to the second network television feed.

11. The system according to claim 8, wherein the content recognition system is operable to accept and handle, via a server, analytics data communicated from one or more media devices or one or more fingerprint matching systems, wherein at least part of the analytics data indicates types of media devices that are interacting with the one or more interactive events.

12. The system according to claim 8, wherein the one or more interactive events and the user response data are synchronized, based on the common network reference clock, to the second network television feed based on network time reference information.

13. The system according to claim 8, wherein the content recognition system is operable to indicate to the one or more servers, via an interactive director within the content recognition system, the one or more interactive events that are to be communicated to the media device.

14. The system according to claim 8, wherein the user response data is associated with a user account on a system that supports a plurality of user accounts.

15. A method, comprising:
in a media device that is operable to read a network television feed:
receiving one or more interactive events from a content recognition system comprising an abstraction layer that is operable to assign, by a real-time event manager based on a common network reference clock utilized by the content recognition system, same interactive event identifiers to different sets of fingerprints generated by different video fingerprint technologies;
executing the one or more interactive events to perform:
displaying one or more overlay windows, wherein the displaying occurs at time that is synchronized, based on the common network reference clock, to the network television feed;
accepting user response data from a user, wherein the user response data is accepted during a time period that is synchronized, based on the common network reference clock, to the network television feed; and
communicating the user response data to a data server, wherein the communication occurs at a time that is synchronized, based on the common network reference clock, to the second network television feed.

16. The method of claim 15, wherein the one or more interactive events are operable to accept input from a user communicated via the media device or via a second-screen device that is in communication with the media device.

17. The method of claim 15, wherein the executing of the one or more interactive events comprises:
displaying an opt-in window that provides a user with a choice regarding whether to interact with the interactive event; and
accepting input from the user regarding whether to interact with the interactive event.

18. The method of claim 15, wherein the executing of the one or more interactive events comprises accepting interactive event results communicated from the data server, wherein the interactive event results are based on the user response data communicated to the system and user response data communicated from one or more other media devices to the data server.

19. The method of claim 15, wherein the executing the one or more interactive events comprises displaying the interactive event results, wherein the displaying occurs at time that is synchronized, based on the common network reference clock, to the network television feed.

20. The method of claim 15, wherein the one or more interactive events utilize an application programming interface associated with an application developer.

* * * * *